US012717071B2

(12) United States Patent
Hashimoto et al.

(10) Patent No.: US 12,717,071 B2
(45) Date of Patent: Aug. 25, 2026

(54) LIGHT-REFLECTING MEMBER AND LIGHT SOURCE DEVICE

(71) Applicant: NICHIA CORPORATION, Anan (JP)

(72) Inventors: Toshiyuki Hashimoto, Anan (JP); Naoya Kashiwagi, Itano-gun (JP); Toshinobu Katsumata, Fujiyoshida (JP)

(73) Assignee: NICHIA CORPORATION, Anan (JP)

( * ) Notice: Subject to any disclaimer, the term of this patent is extended or adjusted under 35 U.S.C. 154(b) by 980 days.

(21) Appl. No.: 17/702,415

(22) Filed: Mar. 23, 2022

(65) Prior Publication Data

US 2022/0308272 A1 Sep. 29, 2022

(30) Foreign Application Priority Data

Mar. 24, 2021 (JP) ................................ 2021-049435
Feb. 18, 2022 (JP) ................................ 2022-023806

(51) Int. Cl.
*G02B 5/09* (2006.01)
*G02F 1/13357* (2006.01)

(52) U.S. Cl.
CPC ......... *G02B 5/09* (2013.01); *G02F 1/133602* (2013.01); *G02F 1/133611* (2013.01)

(58) Field of Classification Search
CPC . G02B 5/09; G02B 19/0019; G02F 1/133602; G02F 1/133611; G02F 1/133605; G02F 1/133553
See application file for complete search history.

(56) References Cited

U.S. PATENT DOCUMENTS 8,328,391 B2 * 12/2012 Snijder .................. F21V 11/06 362/97.3
2007/0052663 A1 3/2007 Kim et al.
2013/0128128 A1 * 5/2013 Ikuta ................ G02F 1/133605 349/67
2013/0148035 A1 6/2013 Shimizu
2016/0291408 A1 10/2016 Yoon et al.
2017/0045779 A1 * 2/2017 Kamiyoshihara ........................... G02F 1/133608

(Continued)

FOREIGN PATENT DOCUMENTS

JP 2016-062765 A 4/2016
JP 2019-024071 A 2/2019

(Continued)

*Primary Examiner* — Abdulmajeed Aziz
*Assistant Examiner* — Jessica M Apenteng
(74) *Attorney, Agent, or Firm* — Spencer Fane LLP

(57) ABSTRACT

A light-reflecting member includes a plurality of first regions and a plurality of second regions. The first regions are each defined by a first portion and a plurality of first wall portions surrounding the first portion in a plan view with the first wall portions being connected to the first portion. The first regions are arranged in a tessellation in the plan view. The second regions are arranged on an outer side relative to the first regions in the plan view. Each of the second regions includes a second portion located higher than the first portion of each of the first regions. The second portion is connected to at least one second wall portion on a side closer to an adjacent one of the first regions, the at least one second wall portion having a height smaller than a height of the first wall portion as measured from the first portion.

19 Claims, 13 Drawing Sheets

(56) References Cited

U.S. PATENT DOCUMENTS

| | | | | |
|---|---|---|---|---|
| 2019/0163021 | A1 | 5/2019 | Jung et al. | |
| 2019/0305197 | A1 | 10/2019 | Yamada | |
| 2020/0285117 | A1* | 9/2020 | Hashimoto | G02F 1/133608 |
| 2024/0401774 | A1* | 12/2024 | Shen | F21V 7/0066 |

FOREIGN PATENT DOCUMENTS

| | | | | |
|---|---|---|---|---|
| JP | 2019-102458 | A | 6/2019 | |
| JP | 2021-022531 | A | 2/2021 | |
| KR | 10-2021-0025308 | A | 3/2021 | |
| WO | WO-2005124404 | A1 * | 12/2005 | G02B 27/142 |
| WO | 2012/029601 | A1 | 3/2012 | |
| WO | 2012029598 | A1 | 3/2012 | |

* cited by examiner

FIG. 2B 20
13W 13W 13B
14W 12B 12W 15B 12W 12B
13W
12B
12W
11B 11W
12W
12B
12W
13W
12B
12W
15B
14W
15B
11B 11W
16

LIGHT-REFLECTING MEMBER AND LIGHT SOURCE DEVICE

CROSS-REFERENCE TO RELATED PATENT APPLICATION

This application claims priority to Japanese Patent Application No. 2021-049435, filed on Mar. 24, 2021, and Japanese Patent Application No. 2022-023806, filed on Feb. 18, 2022. The entire disclosures of Japanese Patent Application Nos. 2021-049435 and 2022-023806 are hereby incorporated herein by reference.

BACKGROUND

Technical Field

The present disclosure relates to a light-reflecting member and a light source device.

Description of Related Art

Various surface-emitting light source devices have been proposed as direct-type backlights for use in LCD televisions and in-vehicle instruments (for example, WO 2012/029601A and JP 2021-22531). These light source devices have a plurality of light sources arranged in a matrix on a substrate, and light-reflecting wall portions surrounding each of the light sources for demarcation.

SUMMARY

It is preferable that the demarcated regions have a same size and a same shape, and a light source is disposed in each of the demarcated regions. Such a configuration may include regions with sizes or shapes to which light sources may be difficult to dispose, at an outer peripheral portion of the light-reflecting wall portion. The presence of such regions may result in uneven brightness within the light-emitting surface.

Accordingly, an object of the disclosure is to provide a light-reflecting member and a light source device in which occurrence of uneven brightness in a light-emitting surface is reduced or substantially prevented.

Certain embodiments of the present invention include the aspects described below.

In one embodiment, a light-reflecting member includes a plurality of first regions and a plurality of second regions. The first regions are each defined by a first portion and a plurality of first wall portions surrounding the first portion in a plan view with the first wall portions being connected to the first portion. The first regions are arranged in a tessellation in the plan view. The second regions are arranged on an outer side relative to the first regions in the plan view. Each of the second regions includes a second portion located higher than the first portion of each of the first regions. The second portion is connected to at least one second wall portion on a side closer to an adjacent one of the first regions, the at least one second wall portion having a height smaller than a height of each of the first wall portions as measured from the first portion.

In one embodiment, a light-reflecting member includes a plurality of inner bottom portions, and a plurality of wall portions surrounding each of the inner bottom portions, As measured from the inner bottom portions, the wall portions located on an inner side have the same height, and the wall portions located on an outer side have smaller heights than the wall portions located on the inner side.

In one embodiment, a light source device includes a substrate, a plurality of light sources disposed on the substrate, and the light-reflecting member described above disposed on the substrate. The first portions of the light-reflecting member respectively define through-hole. the light-sources are respectively located within the through-holes.

According to certain embodiments of the present invention, light-reflecting members and light source devices in which occurrence of uneven brightness in respective light emitting surfaces can be reduced or avoided.

BRIEF DESCRIPTION OF THE DRAWINGS

FIG. 2B is a perspective view of a main portion of the light-reflecting member shown in FIG. 2A.

DETAILED DESCRIPTION OF EMBODIMENTS

Figure 1A:
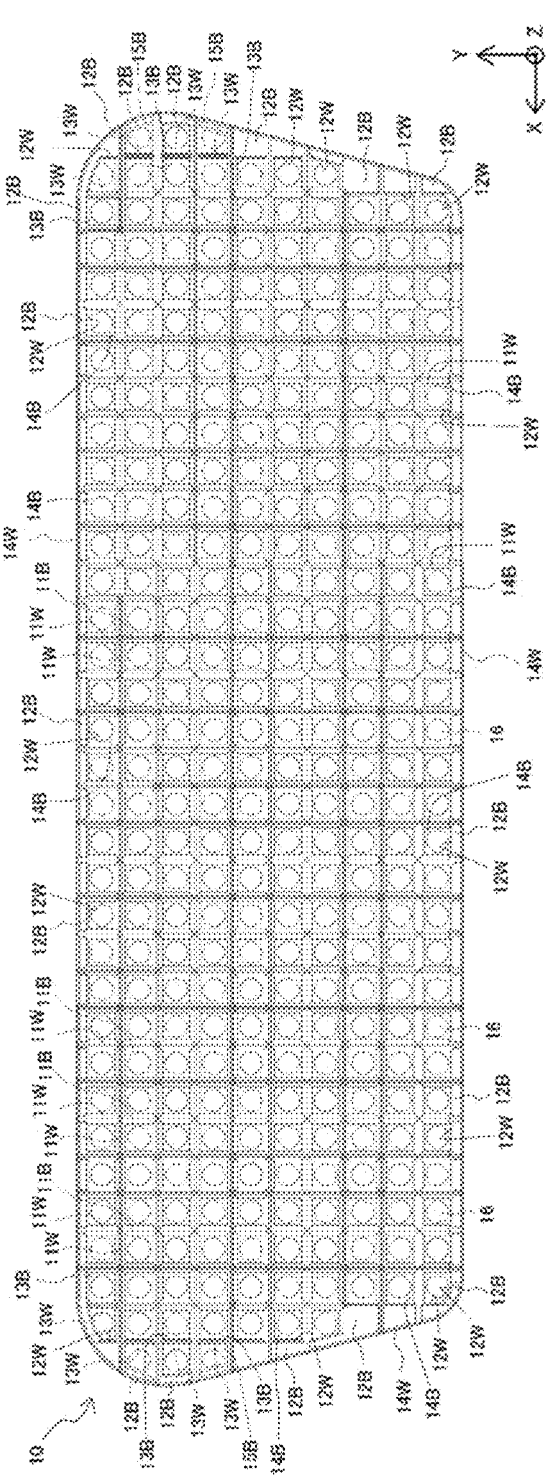
FIG. 1A is a schematic plan view of a light-reflecting member according to one embodiment of the present invention.
Figure 1B:
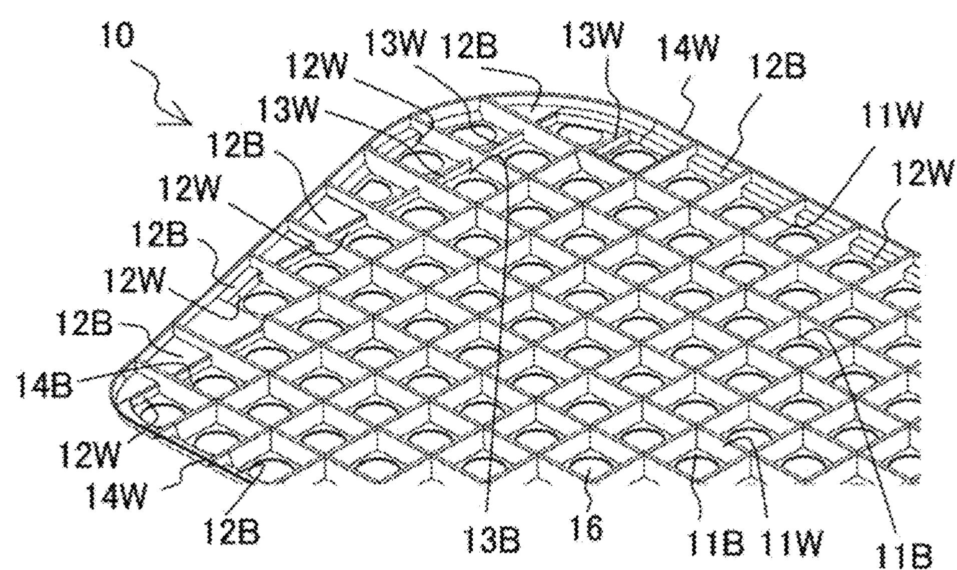
FIG. 1B is a perspective view of a portion of the light-reflecting member shown in FIG. 1A.
Figure 1C:
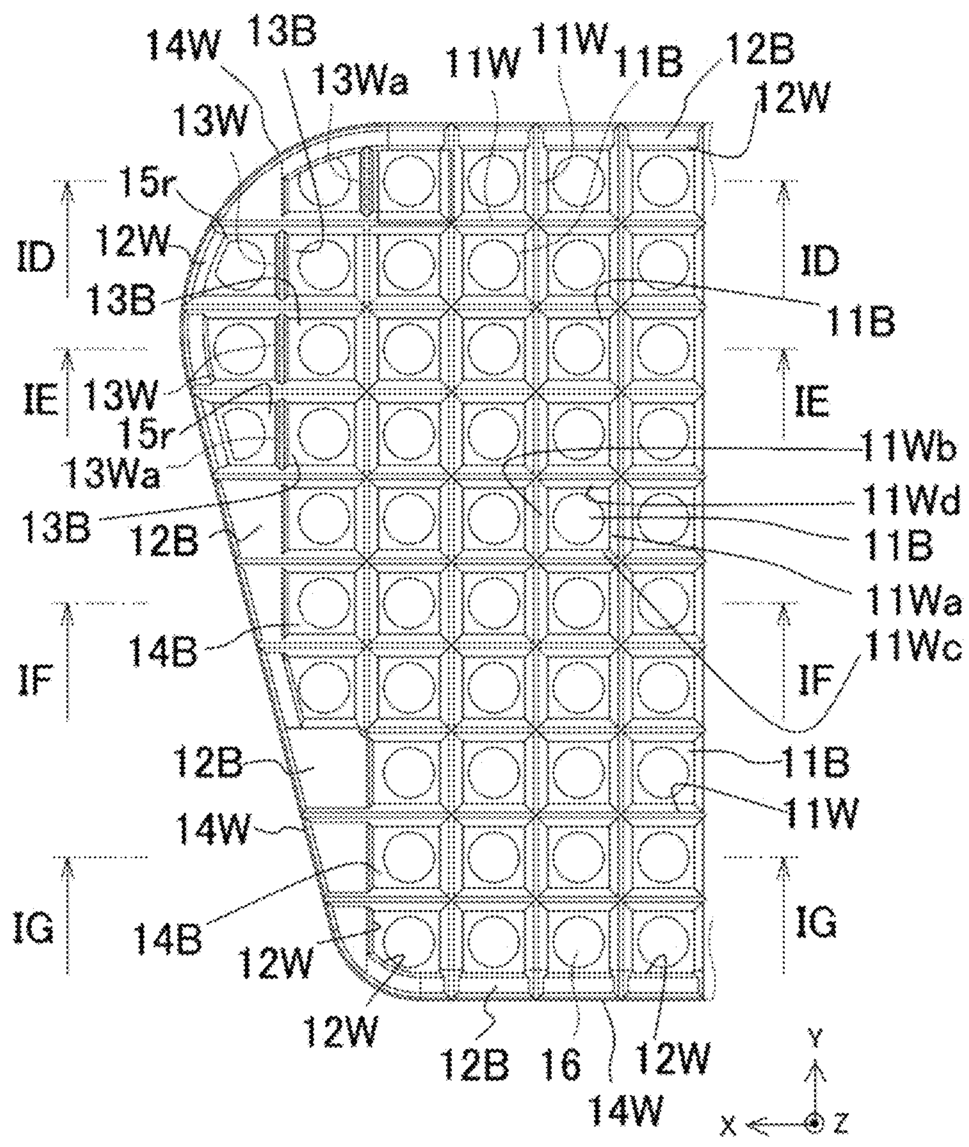
FIG. 1C is an enlarged view of a main portion of the light-reflecting member shown in FIG. 1A.
Figure 1D:
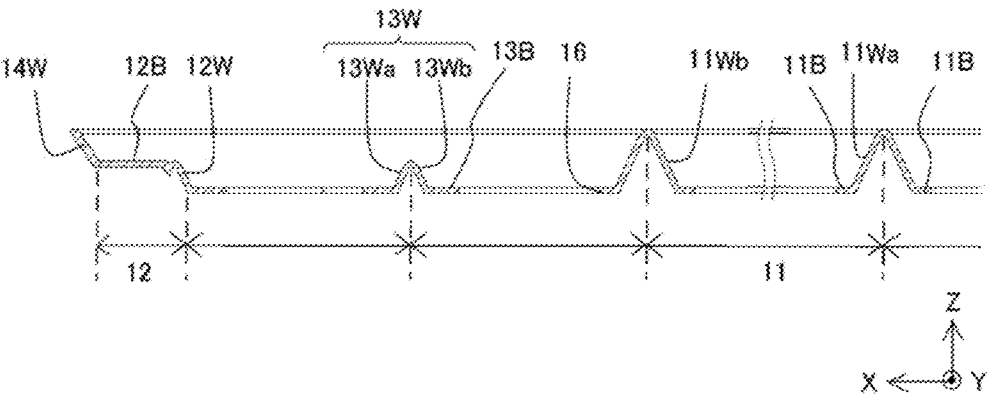
FIG. 1D is a partially enlarged view of the cross-section taken along line ID-ID of FIG. 1C.

Certain embodiments according to the present disclosure will be described below with reference to the accompanying drawings. It is to be noted that the embodiments described below are intended for implementing the technical concept of the present invention, and the present invention is not limited to those described below unless otherwise specified. Description given in one embodiment and one example can also be applied in other embodiments and examples. The size, positional relationship and the like of components shown in the drawings may be exaggerated for the sake of clarity.

In the embodiments described below, a light extracting surface side of a light source of the light source device may be referred to as an “upper surface” or “upper side”. Also, expressions “higher” or “lower” or “higher location” or “lower location” may refer to a relative positional relationship among corresponding components or the like, where “higher” and “lower” may refer to be at opposite direction to each other. Unless otherwise noted, when viewed from the upper surface side (in a plan view), relatively, a location closer to the center of the light-reflecting member, the substrate, or the light source device may be referred to as an “inner side” or “inward”, and a location opposite from the center may be referred to as “outer side” or “outward”. Note that a cross-sectional view may be an end surface view only showing a configuration on a cutting plane.

Light-Reflecting Member

As shown in FIGS. 1A to 1J, a light-reflecting member 10 according to one embodiment of the present invention includes at least a plurality of first regions 11, a plurality of second regions 12, and a plurality of second wall portions 12W in a plan view. Each of the first regions 11 includes a first portion 11B and first wall portions 11W that surround and that are connected to the first portion 11B, and thus defining a single first demarcated region. The first demarcated regions (the first regions) are arranged in a tessellation in the plan view. In the specification, the term “a tessellation” refers to an entire shape made of an arrangement of a countable number of types of two-dimensional shapes that cover the whole of a predetermined flat surface (a plane) without any overlapping or gaps in the plan view. The second regions 12 are located on the outer side relative to the first regions 11 in the plan view. Each of the second regions 12 has a second portion 12B located higher than the first portions 11B. Each of the second wall portions 12W is lower than the first wall portions 11W and is connected to the second portions 12B at a side close to the first regions 11.

In other words, the light-reflecting member 10 includes a plurality of inner bottom portions (for example, the first portions 11B etc.) and wall portions (for example, the first wall portions 11W) surrounding each of the inner bottom portions. Outer wall portions located at an outer side (for example, the third wall portions 13W) have heights with respect to the inner bottom portions lower than inner wall portions (for example, the first wall portions 11W) located on the inner sides with respect to the outer wall portions, and a plurality of the inner wall portions have a uniform height with respect to the inner bottom portions.

With the structure as describe above, even when a light-reflecting member has one or more demarcated regions at an outer peripheral portion of the light-reflecting member where a light source cannot be placed, occurrence of uneven brightness within the light-emitting surface can be reduced. This is because, for example, the second portions 12B are located higher than the first portions 11B, such that when light from a light source disposed in a demarcated region that is located at an inner side relative to the second region 12 arrives in the second region 12, the light can be reflected upward efficiently by the second portions 12B.

The light-reflecting member 10 can be obtained by applying pressing to a flat-plate-shaped material to form protruding portions and recessed portions, such that a single protruding portion has two lateral surfaces that meet to form a ridge, where each lateral surface serves as a wall portion. The interior of each protruding portion may be hollow.

The light-reflecting member 10 can be used as a demarcated member in a light source device with a plurality of light sources, where the demarcated member accommodates the plurality of light sources whose light-emitting regions are defined by corresponding wall portions. Each of the regions having an inner bottom portion surrounded by wall portions (more specifically, inwardly facing lateral surfaces of protruding portions surrounding a single inner bottom portion) may be referred to as a single demarcated region. The light-reflecting member 10 includes a plurality of demarcated regions. The demarcated region of each of the first regions corresponds to a region between the ridges (upper ends in a cross-sectional view) of the first wall portions 11W (See for example, cross-sectional views of FIG. 1F and FIG. 2D) that face across a corresponding one of the first portions 11B. The demarcated regions of the first regions may be referred to as first demarcated regions.

Figure 1E:
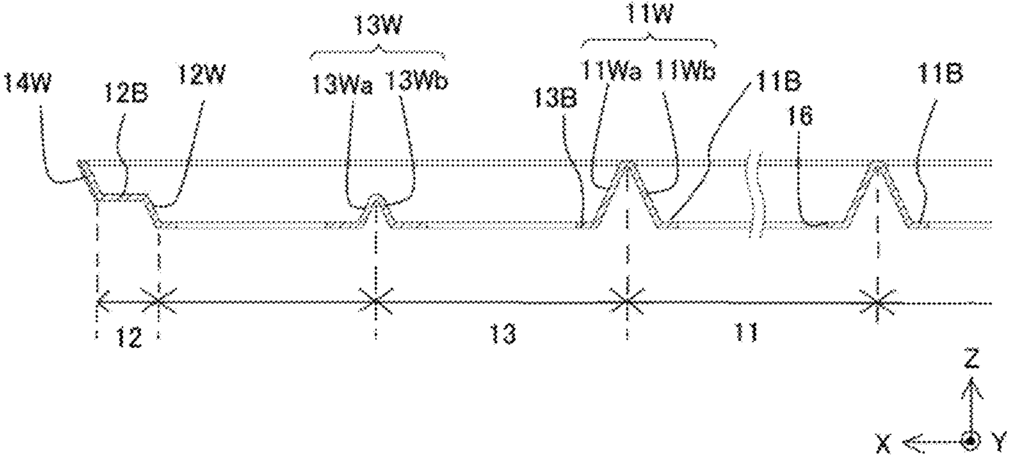
FIG. 1E is a partially enlarged view of the cross-section taken along line IE-IE of FIG. 1C.
Figure 1F:
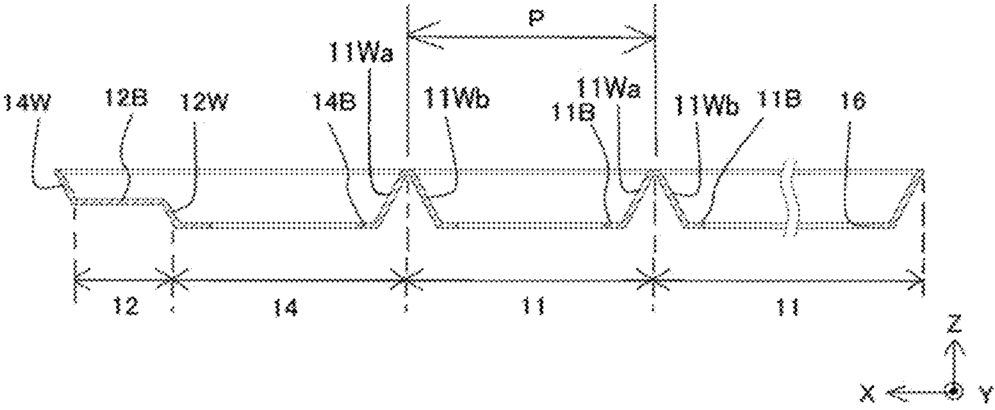
FIG. 1F is a partially enlarged view of the cross-section taken along line IF-IF of FIG. 1C.
Figure 1G:
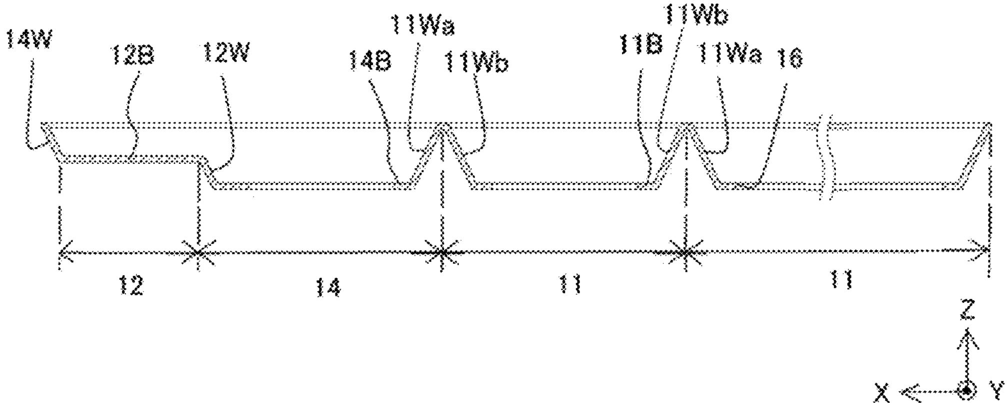
FIG. 1G is a partially enlarged view of the cross-section taken along line IG-IG of FIG. 1C.
Figure 1H:
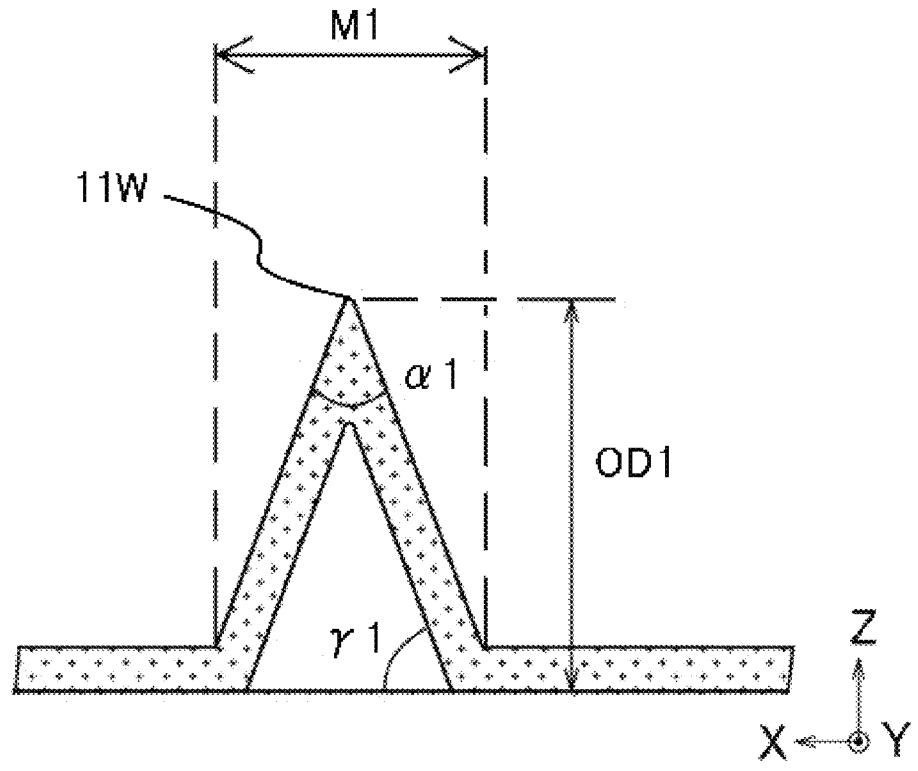
FIG. 1H is a partially enlarged schematic cross-sectional view of a first wall portion 11W shown in FIG. 1A.
Figure 1I:
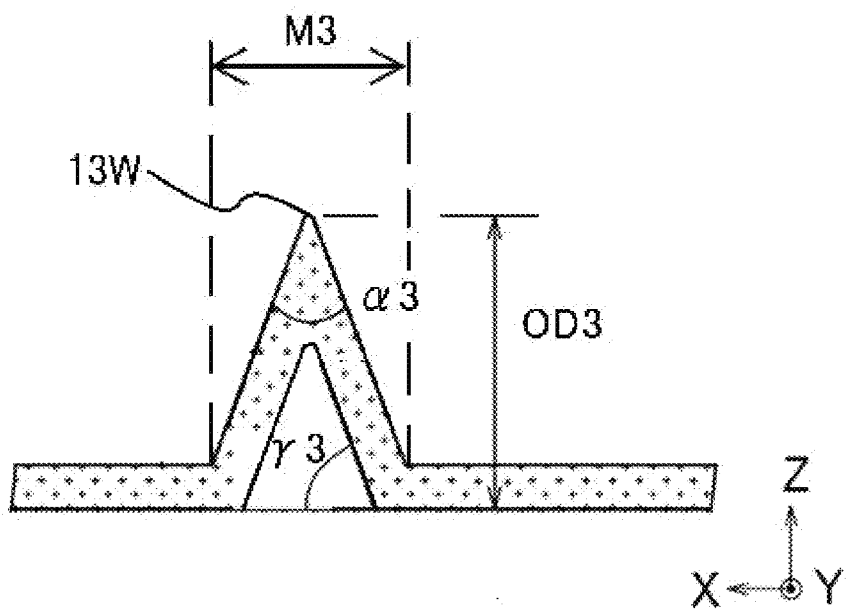
FIG. 1I is a partially enlarged schematic cross-sectional view of a third wall portion 13W shown in FIG. 1A.
Figure 1J:
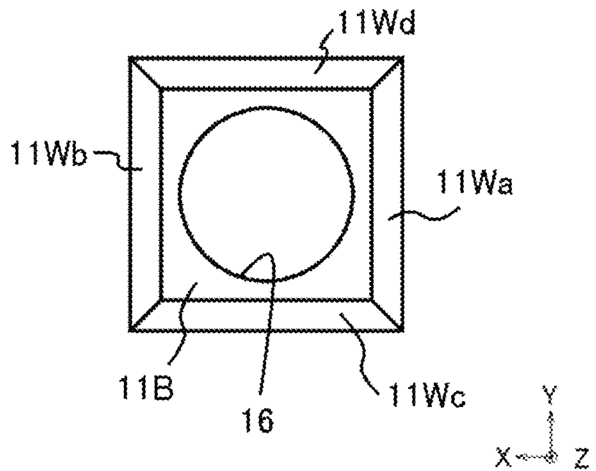
FIG. 1J is a schematic plan view of a single demarcated region of a first region shown in FIG. 1A.

As shown in FIG. 1J, among the first wall portions 11W, the lateral surface of the first wall portion 11W located at a positive X-direction (the direction from the right to the left in FIG. 1J) is indicated as 11Wa, the lateral surface of the first wall portion 11W located at a negative X-direction (the direction from the left to the right in FIG. 1J) is indicated as 11Wb, the lateral surface of the first wall portion 11W located at a positive Y-direction in FIG. 1J is indicated as 11Wc, and the lateral surface of the first wall portion 11W located at a negative Y-direction in FIG. 1J is indicated as 11Wd, with respect to the directions corresponding to the first portions 11B. In this case, each of the first demarcated regions is defined by a first portion 11B, a lateral surface 11Wa of a first wall portion 11W located in the positive X-direction side of the first portion 11B, a lateral surface 11Wb of a first wall portion 11W located in the negative X-direction side of the first portion 11B, a lateral surface 11Wd of a first wall portion 11W located in the negative Y-direction side of the first portion 11B, and a lateral surface 11Wc of a first wall portion 11W located in the positive Y-direction side of the first portion 11B.

Each demarcated region has a recessed shape defined by the wall portions (11Wa, 11Wb, 11Wc and 11Wd) and the inner bottom portion (11B). A through-hole can be formed in the inner bottom portion of the recessed shape as described below.

The light-reflecting member may have a shape in a plan view, that is an outer shape, of, for example, a polygonal shape such as a square shape or a rectangular shape, a circular shape, or an elliptic shape, or a shape which is a combination of two or more shapes of various sizes, such as a polygonal shape such as a triangular shape or a quadrangular shape, a circular shape, an elliptic shape (hereafter may be referred to as a “non-regular shape”). Even in the presence of one or more regions in the outer peripheral portion of the light-reflecting member where the light source cannot be placed regularly, it can still be demonstrated that the light from a plurality of light sources can be reflected toward the light-emitting surface so that occurrence of uneven brightness within the light-emitting surface can be reduced or prevented.

The light-reflecting member include demarcated regions of, for example, a plurality of first regions 11 and a plurality of second regions 12. In addition to those regions, the light-reflecting member can further include at least one of a plurality of third regions 13, a plurality of fourth regions 14, and a plurality of fifth regions 15 as demarcated regions. Also, the light-reflecting member may include a fourth wall portion 14W located along the outer periphery of the light-reflecting member.

Each of the first regions 11 includes a first portion 11B and a plurality of first wall portions 11W surrounding and connected to the first portion 11B. The first wall portions 11W can be referred to as the inner wall portions.

Each of the second regions 12 includes a second portion 12B. The second portion 12B is connected to at least one second wall portion 12W.

Each of the third regions 13 includes a third portion 13B and first wall portions 11B and a third wall portion 13W, including a third wall portion 13W, surrounding and connected to the third portion 13B. The third wall portion 13W can be referred to as an outer wall portion.

Each of the fourth regions 14 includes a fourth portion 14B and wall portions surrounding and connected to the fourth portion 14B.

Each of the fifth regions 15 includes a fifth portion 15B and wall portions surrounding and connected to the fifth portion 15B. Each of the fifth portions is connected to the fourth wall portion 14W.

In other words, the first regions can be referred to as an inner region. Further, the entire outer periphery (for example, four sides) of each of the first portions is surrounded by the high walls of the first wall portions.

The second regions can be referred to as an outer peripheral region.

The third regions can be referred to as an inner side region of an outer region. Each of the third regions is surrounded by wall portions, of which at least one wall portion (for example, a single side) is a third wall portion that has a small height.

The fourth regions can be referred to as an outer side region of the outer region. Also, at least one wall portion corresponding to each of the fourth portions has a small height.

The fifth regions can be referred to as an outer region. The fifth regions are located adjacent to the outer periphery of the light-reflecting member.

The first portions 11B, the second portions 12B, the third portions 13B, the fourth portions 14B and the fifth portions 15B may be referred to as the first inner bottom portions, the second inner bottom portions, the third inner bottom portions, the fourth inner bottom portions, and the fifth inner bottom portions. The second regions 12 are the regions where no light sources are disposed. The first regions 11, the third regions 13, the fourth regions 14, and the fifth regions 15 can be used as light-emitting regions where light sources are disposed, but some of the regions among those may include regions where no light sources are disposed, due to the shape of the light-reflecting member 10 in a plan view.

First Region 11

Each of the first regions 11 includes the first portion 11B, which is the inner bottom surface, and the first wall portions 11W surrounding the first portion 11B. The first regions 11 collectively refer to a region in which the first demarcated regions defined by the first portion 11B and the first wall portions 11W are arranged in tessellation.

Figure 2A:
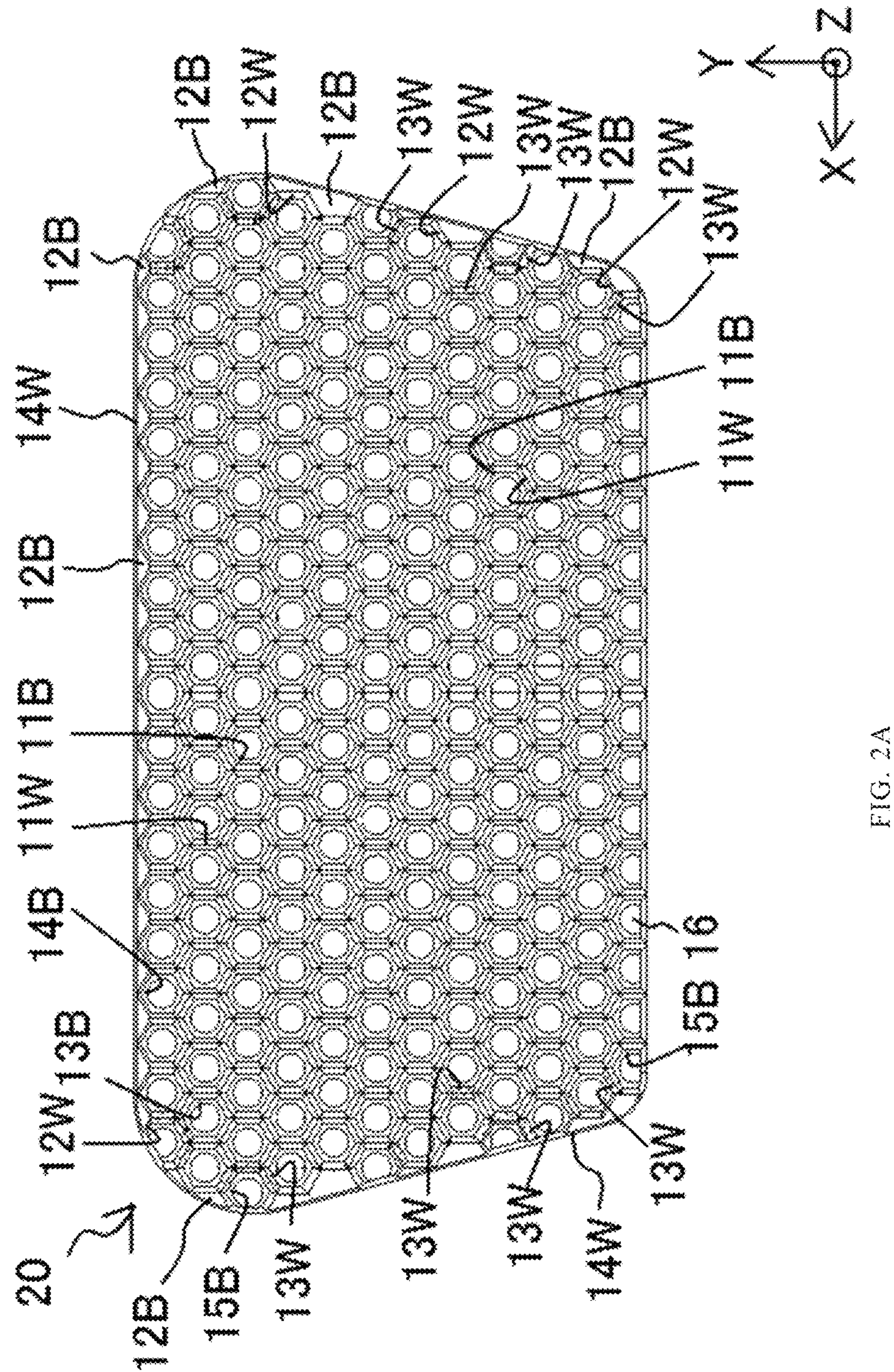
FIG. 2A is a schematic plan view of a light-reflecting member according to another embodiment of the present invention.
Figure 2B:
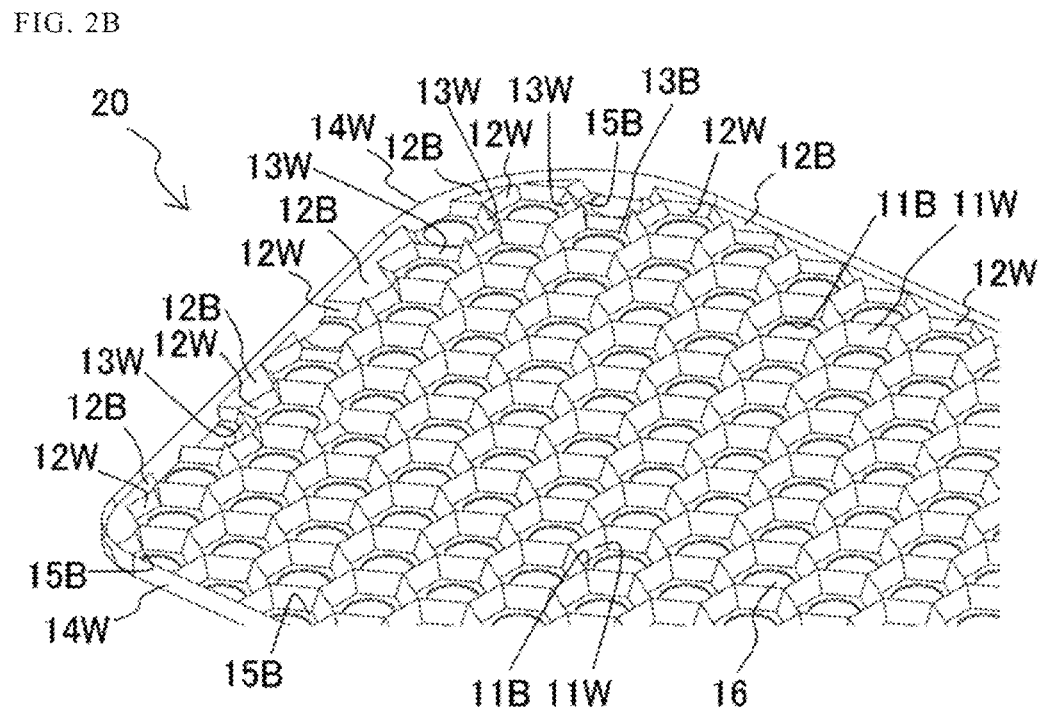
Figure 3:
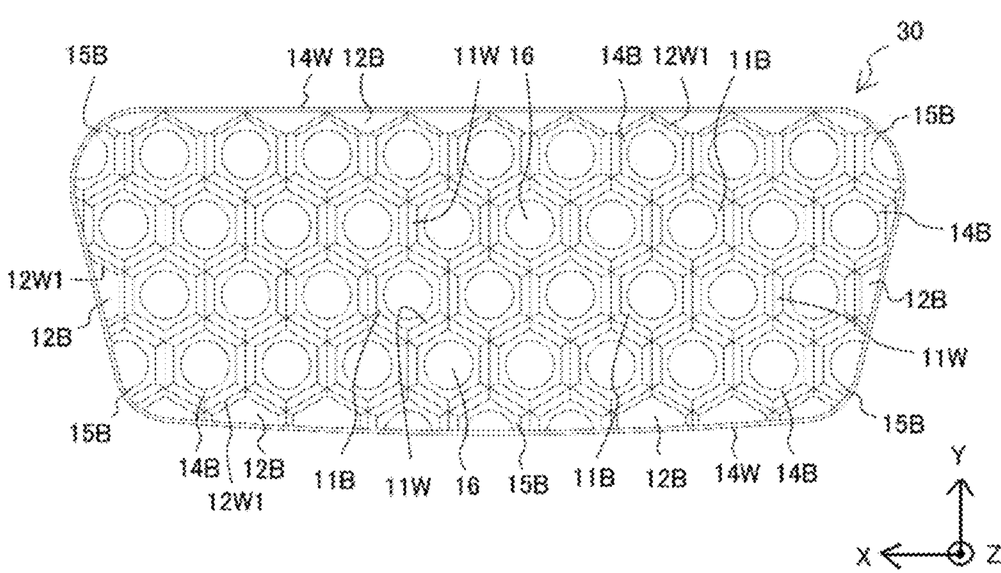
FIG. 3 is a schematic plan view of a light-reflecting member according to still another embodiment of the present invention.

The first portions 11B have a shape such as a circular shape, an elliptic shape, a triangular shape, or a quadrangular shape in a plan view. The first portions 11B preferably have a shape that allows tessellation. Examples of such shapes that allow tessellation include a square shape (FIG. 1A etc.) a rectangular shape, and a hexagonal shape (FIG. 2A, FIG. 3, etc.). Each of the first portions 11B may have an uneven portion on its surface or may have a flat surface. Each of the first portion 11B may be formed with a through-hole. The light sources can be arranged within the through-holes in a plan view. Each of the first portion 11B preferably has dimensions that can accommodate a single light source in a plan view.

The entire periphery of each of the first portions 11B is surrounded by the first wall portions 11W. It is preferable that the first wall portions 11W surrounds a corresponding one of the first portions 11B along the outer shape of the first portion 11B in a plan view. For example, when each of the first portions 11B is in a square shape, a rectangular shape, or a hexagonal shape, lower edges of the first wall portions 11W surround the first portion 11B with an outer shape that is a same shape and greater dimensions than that of the first portion 11B in a plan view. When in a plan view, the ridges of the first wall portions 11W surrounding each of the first portions 11B form a shape that can be tessellated, the first regions 11 can be arranged to form a tessellated region.

It is preferable that each of the first wall portions 11W has a height OD1 from the outer bottom surface of the first portion 11B to the upper end of the first wall portion 11W (see FIG. 1H) that is, for example, greater than the height of the light source located in the first region 11. The height OD1 of the first wall portions 11W can be 800% or less, preferably 500% or less, more preferably 300% or less, with respect to the height of the light source located in the first region 11. More specifically, the height OD1 of the first wall portions 11W can be 20 mm or less, preferably 8 mm or less. When a light source device of smaller thickness is determined to obtain, the height OD1 is preferably in a range of 1 to 4 mm. With this arrangement, the thickness of the device that includes a backlight unit containing an optical member such as a light-diffusing plate to be described later below can be greatly reduced. All the first wall portions 11W preferably have a same height. In other words, it is preferable that the ridges (the uppermost position) of the first wall portions 11W are located at a same height in the light-reflecting member 10.

The pitch (P in FIG. 1F) of the first wall portions 11W can be appropriately adjusted according to the size of the light sources, the size of the light source device. The pitch of the first wall portions 11W can be, for example, in a range of 1 to 50 mm, preferably in a range of 5 to 20 mm, more preferably in a range of 6 to 15 mm.

The lateral surfaces of the first wall portions 11W are inclined relative to the first portion 12B in the example shown in FIG. 1H. The angle of inclination ($\gamma$1 in FIG. 1H) can be set appropriately according to the height OD1 of the first wall portions 11W, for example, in a range of 45 to 80 degrees. The upper end portion of each of the first wall portions 11W may be flat, thin as shown in FIG. 1H etc., or rounded. In other words, in a cross-section shown in FIG. 1E (that is, in an X-Z plane), the first wall portions 11W may have a quadrangular shape (a rectangular shape, a trapezoidal shape, or the like), or a triangular shape (that may have a rounded apex). The first wall portions 11W may have flat surfaces or have irregular surfaces.

Second Region 12

Figure 2C:
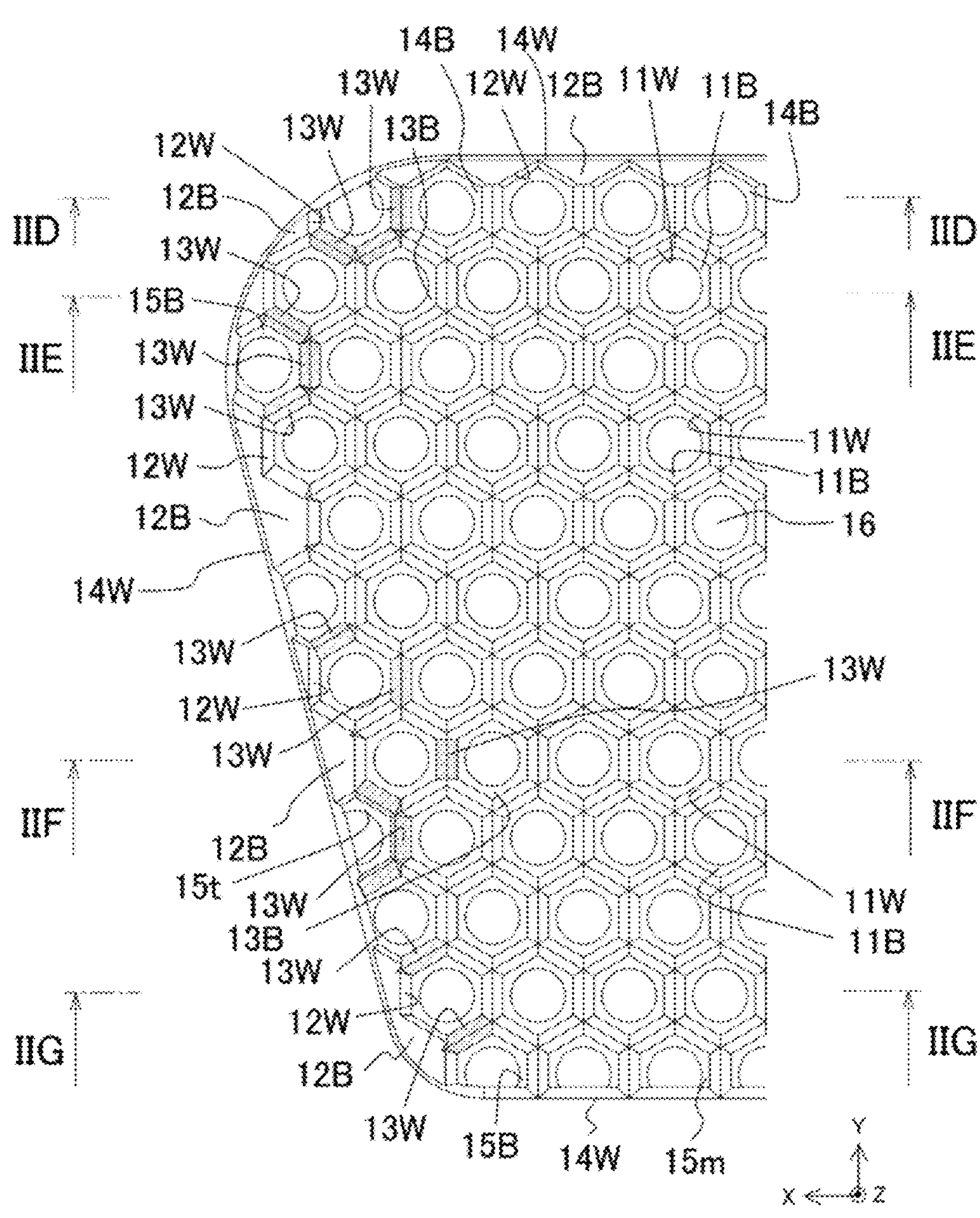
FIG. 2C is an enlarged view of a main portion of the light-reflecting member shown in FIG. 2A.
Figure 2D:
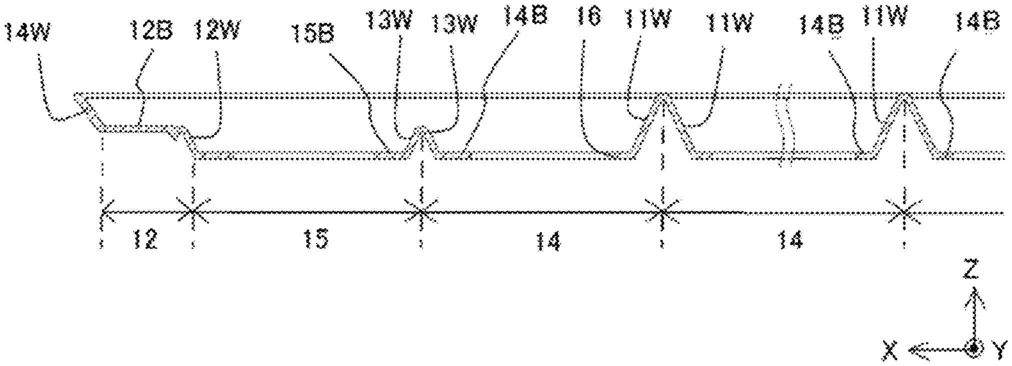
FIG. 2D is a partially enlarged view of the cross-section taken along line IID-IID of FIG. 2C.
Figure 2E:
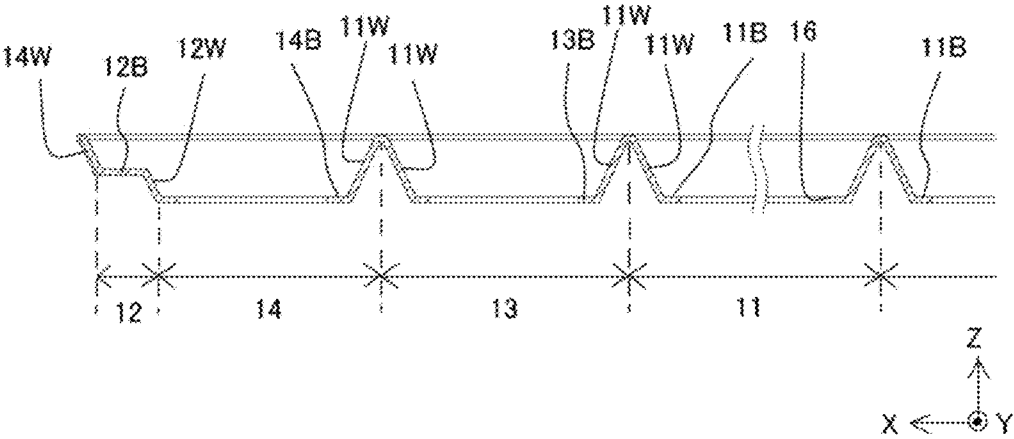
FIG. 2E is a partially enlarged view of the cross-section taken along line IIE-IIE of FIG. 2C.
Figure 2F:
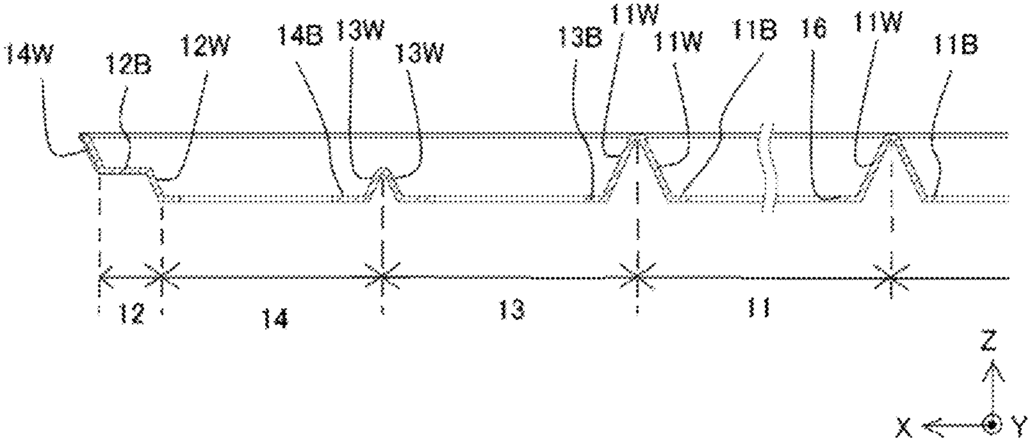
FIG. 2F is a partially enlarged view of the cross-section taken along line IIF-IIF of FIG. 2C.

As shown in FIG. 1E, FIG. 2D, etc., each of the second regions 12 includes a second portion 12B that is located higher than the first portions 11B, in other words, located closer to the upper ends of the first wall portions 11W than the first portion 11B to the upper ends of the first wall portions 11W. The second regions 12 are located on the outer side with respect to the first regions 11. Each of the second regions 12 may be located partially or completely adjacent to the first regions 11, or partially or completely spaced apart from the first regions 11. The second regions 12 are located adjacent to the outer periphery of the light-reflecting member 10. The second portions 12B are connected to the fourth wall portion 14W, which is described below, located along the outer edge of the light-reflecting member. One or more second regions 12 may be located spaced apart from the first regions 11.

As described above, in a plan view, the light-reflecting member 10 according to the present embodiment may have demarcated regions where the light sources cannot be disposed, or in other words, where the light sources of predetermined shape and size cannot be disposed. Therefore, in the second regions 12, which are located on an outermost periphery of the light-reflecting member 10, the second portions 12B having shapes that are different from the shape of the first portions 11B are respectively arranged.

The second regions 12 may or may not be demarcated by wall portions having the same height as the first wall portions. As the second region 12, only a single second portion 12B may be arranged, or a plurality of the second portions 12B may be arranged adjacent to each other or spaced apart from one other.

Each of the second portions 12B preferably has planar dimensions smaller than the first portion 11B. For example, the planar dimensions of a single second portion 12B may be in a range of 95 to 5% of the planar dimensions of a single first portion 11B in a plan view. When adjacent second portions are connected with each other, the planar dimensions of the second portions may be greater than each of their adjacent first portions in a plan view. The second portions 12B may have various shapes in a plan view according to the outer shape of the light-reflecting member 10.

The surfaces of the second portions 12B can be flat or irregular. The second portions 12B are located higher than the first portions 11B and lower than the upper ends of the first wall portions 11W. For example, it is preferable that the lowest parts of the second portions 12B are located between 50 and 80%, 50 and 65% of the height OD of the first wall portions 11W. The second portions 12B may have a uniform height or may be inclined toward the upper surfaces of respective corresponding first portions 11B. When the second portions 12B are tilted, the heights of the second portions may be reduced or increased toward the first region 11 side. When the heights of the second portions are reduced toward the first region 11 side, the light from the respective light sources incident on the second regions 12 can be efficiently reflected upwards. When the second portions 12B are inclined, the angle of inclination can be, for example, 30 degrees or less relative to the first portions 11B of the first regions 11, respectively. With such portions arranged at the outer peripheral portion of the light-reflecting member, light traveling from the inner side of the light-reflecting member can be reflected upward at the outer periphery, thus can facilitate a reduction in occurrence of uneven brightness within the light-emitting surface.

Each of the second portions 12B is connected to at least one second wall portion 12W, which is lower than the upper ends of the first wall portions 11W, on the side near the first regions 11. In this case, each of the second portions 12B may be connected to halfway up the height of the second wall portions 12W, or may be connected to an upper end of the second wall portion(s) 12W, as shown in FIG. 1E.

In other words, in each of the second regions 12, at least one second wall portion 12W is located adjacent to the second portion 12B on the side closer to the first regions 11.

Third Region 13

It is preferable that the light-reflecting member 13 further includes a plurality of third regions 13. The third regions 13 are located on the outward than the first regions 11. The third regions 13 are located on the outward than the first regions 11 and adjacent to the first regions 11. Also, the third regions 13 are located inward than the second regions 12.

Each of the third regions 13 includes a single third portion 13B that is an inner bottom portion, and at least one first wall portion 11W and at least one third wall portion 13W, which collectively surround the third portion 13B. In other words, each of the third regions 13 defines a single third demarcated region with a single third portion 13B surrounded by wall portions including at least one first wall portion 11W and at least one third wall portion 13W, and one or more, preferably a plurality of the third demarcated regions are arranged. In the present specification, "a single third demarcated region" refers to a region that includes a single third portion 13B and at least one first wall portion 11W and at least one third wall portion 13W surrounding the entire outer periphery of the single third portion 13B, and between facing ridges of the wall portions (see for example, FIG. 1E).

Either a single or a plurality of third portions 13B may be arranged in a single third region 13. The third region 13 may be arranged outward of each of the first regions 11 or may be arranged outward of some of the first regions 11.

The third portions 13B may be formed in the same shape and size as the first portions 11B. When a plurality of third portions 13B are arranged, all the third portions 13B preferably have the same shape in a plan view and the same size. All or some of the third portions 13B of the third regions 13 are preferably located in a same plane. In other words, it is preferable that all the third portions 13B are arranged with the same height with respect to the height of the upper end portions (the uppermost position) of the first wall portions 11W. It is also preferable that all the third portions 13B are arranged with the same height with respect to the height of the upper end portions of the first wall portions 11W such that the third portions 13B are on the same plane as the first portions 11B.

When the third portions 13B have a quadrangular shape in a plan view as shown in FIG. 1A etc., each of the third portions 13B may be surrounded by one first wall portion 11W located at one peripheral side and three third wall portions 13W located at three peripheral sides. When the third portions 13B have a regular hexagonal shape in a plan view as shown in FIG. 2A etc., each of the third portions 13B may be surrounded by one third wall portion 13W located at one peripheral side and five first wall portions 11W located at five peripheral sides.

Each of the third wall portions 13W is a part of the wall portions surrounding the outer periphery of each of the third portions 13B.

The third wall portions 13W have a height OD3 (see FIG. 1I) from the outer bottom surface of the third portion 13B to the upper ends of the third wall portions 13W that is smaller than the height OD1 (see FIG. 1H) of the first wall portions 11W. The third wall portions 13W as described above allow light from the light sources located in the third regions 13 to travel above the third wall portions 13W and reach above the second regions 12. Accordingly, the amount of light extracted from the second regions 12 can be increased. More specifically, the height of the third wall portions 13W can be 500% or less, preferably 300% or less, more preferably 200% or less with respect to the height of the light sources placed in the third regions 13. The height of the third wall portions 13W can be 10 mm or less, preferably 4 mm or less. In other words, the third wall portions 13W can have a height OD3 from the outer bottom of the third portion 13B to the upper ends of the third wall portions 13W in a range of 50 to 90%, preferably in a range of 50 to 75% with respect to the height OD1 of the first wall portions 11W. It is preferable that the entire portions of all the third wall portions 13W have a uniform height. In other words, the third wall portions 13W preferably have a height with respect to the first portions 11B same as that of the second wall portions 12W.

In the example shown in FIG. 1I, lateral surfaces of the third wall portions 13W are inclined with respect to the third portion 13B. The angle of inclination (γ3 in FIG. 1I) can be appropriately set according to the height OD3 of the third wall portions 13W, and for example, in a range of 45 to 80 degrees. The upper ends of the third wall portions 13W may be flat, thin, as shown in FIG. 1I etc., or rounded. In other words, the third wall portions 13W may have a quadrangular (rectangular, trapezoidal, etc.), or a triangular (that may have a rounded apex) cross-sectional shape in the X-Z plane.

The demarcated region of each of the third regions 13 refers to the region between the upper end of the third wall portion 13W and the upper end of the first wall portion 11W in FIG. 1E that face each other across the third portion 13B. The third wall portions 13W may have flat surfaces or have irregular surfaces. As shown in FIG. 1H and FIG. 1I, each of the third wall portions 13W has a width M3 smaller than a width M1 of each of the first wall portions 11W, for example, the width M3 is in a range of 50 to 90% of the width M1.

Of the two lateral surfaces of the third wall portions 13W, that meet to form a ridge, one of the lateral surfaces faces a corresponding one of the second wall portions 12W and the other lateral surface of the third wall portion 13W faces a corresponding one of the first wall portions 11W. When the corresponding one of the second wall portions 12W is arranged in the X-direction of the third region 13, it is preferable that the wall portion located along the X-direction of the third region 13 is a third wall portion 13W and the wall portion located along the Y-direction of the third region 13 is a first wall portion 11W. With this arrangement, light from the light sources disposed in the third regions 13 can be easily directed toward the outer peripheral portions of the light-reflecting member.

Fourth Region 14

It is preferable that the light-reflecting member 10 further includes a plurality of fourth regions 14. The fourth regions 14 are located outer side relative to the first regions 11. The fourth regions 14 may be located outer side relative to the third regions 13. The fourth regions 14 may be located adjacent to the first regions 11 on the outer side relative to the first regions 11, or may be located adjacent to the third region 13 on the outer side relative to the third regions 13. The fourth regions 14 may be adjacent to the second regions 12.

A single fourth region 14 includes one fourth portion 14B, which is the inner bottom, and wall portions that include at least one second wall portion 12W connected to the fourth portion 14B. A single fourth region 14 may include at least one first wall portion 11W or at least one first wall portion 11W and at least one third wall portion 13W, in addition to the single fourth portion 14B and the at least one second wall portion 12W. In this case, the at least one first wall portion 11W and the at least one third wall portion 13W are connected to the fourth portion 14B.

For example, as shown in FIG. 1A etc., when each of the fourth portions 14B has a quadrangular shape in a plan view, at least one side of the fourth portion 14B is connected to the second wall portion 12W. Each of the fourth portions 14B may be surrounded by the first wall portions 11W located at three sides of the outer periphery of the fourth portion 14B and one second wall portion 12W located at one side of the outer periphery of the fourth portion 14B, or may be surrounded by one first wall portion 11W located at one side, two second wall portions 12W located at two sides, and one third wall portion 13W located at one side of the outer periphery of the fourth portion 14B. Also, as shown in FIG. 2A etc., when the fourth portions 14B have a regular hexagonal shape, at least one side of a single fourth portion 14B is connected to the second wall portion 12W, or two sides of each of the fourth portion 14B may be connected to the second wall portions 12W. A single fourth portion 14B may be surrounded by the first wall portions 11W located at three sides, one second wall portion 12W located at one side, and the third wall portions 13W located at two sides of the outer periphery of the fourth portion 14B. A single fourth portion 14B may be surrounded by the first wall portions 11W located at two sides, the third wall portions 12W located at two sides, and the third wall portions 13W located at two sides of the outer periphery of the fourth portion 14B. A single fourth portion 14B may be surrounded by the first wall portions 11W located at three sides, the second wall portions 12W located at two sides, and the third wall portion 12W located at one side of the outer periphery of the fourth portion 14B. A single fourth portion 14B may be surrounded by the first wall portions 11W located at five sides, the second wall portions 12W located at two sides, and the third wall portion 12W located at one and the second wall portion located at one side of the outer periphery of the fourth portion 14B. A single fourth portion 14B may be surrounded by the first wall portions 11W located at four sides and the second wall portions 12W located at two sides of the outer periphery of the fourth portion 14B.

In FIG. 1F, the fourth demarcated region 14 is indicated between the lower end of the second wall portion 12W and the upper end of the third wall portion 13W.

A single fourth region 14 may be arranged or a collective fourth region including a plurality of fourth portions 14B may be arranged. The single or collective fourth region 14 may be arranged at outer side relative to each of the first regions 11 or each of the third regions 13, or may be arranged at outer side relative to some of the first regions 11 or some third regions 13.

Each of the fourth portions 14B may have a shape and size the same as that of each of the first portions 11B. It is preferable that when a plurality of fourth portions 14B are collectively arranged, all the fourth regions have the same shape and same size. It is also preferable that the fourth portions 14B of all the fourth regions 14 are on the same plane with each other. In other words, all the fourth portions 14B are preferably at the same height with respect to the upper ends (the uppermost position) of the first wall portions 11W. It is also preferable that the fourth portions 14B are located at the same height with respect to the upper ends of the first wall portions 11W so that the uppermost position of the fourth portions 14B is on the same plane as the uppermost position of the first portions 11B and/or the third portions 13B.

The first wall portions 11W, the second wall portions 12W, and the third wall portions 13W of the present embodiment have the configurations as described above.

Fifth Region 15

The light-reflecting member 10 may also include fifth regions 15. The fifth regions 15 are located at outer side relative to the first regions 11. Some of or all the fifth regions 15 may be arranged adjacent to the first regions 11 or some of or all the fifth regions may be arranged spaced apart from the first regions 11. Among those, it is preferable that the fifth regions 15 are located adjacent to the outer peripheral portion of the light-reflecting member 10.

The fifth regions 15 can be located at an outer side relative to the first regions 11 and adjacent to is outside the first region 11, with the second part 12B, the first region 11, the second region 12, It can be placed adjacent to one or more of the third and fourth regions of 14.

For example, a single fifth region 15 includes a single fifth portion 15B that is an inner bottom portion. The fifth portion 15B may be the same shape and size as the first part 11B, or it may be different and different in size than the first part 11B. For example, the dimensional area of a single fifth region 15 can be in a range of 60 to 120% of the dimensional area of a single first portion 11B. The size and shape of the fifth regions 15 can be set according to the peripheral shape of the light-reflecting member. In other words, when a plurality of fifth regions 15 are arranged, the shape, the size, etc., of some of or all the fifth portions 15B may be different. It is preferable that the fifth portions 15B are on the same plane with each other. In other words, all the fifth portions 15B are preferably located at the same height, for example, with respect to the upper ends of the first wall portions 11W. It is also preferable that the fifth portions 15B are located at the same height as the first portions 11B, the third portions 13B, or the fourth portions 14B with respect to the upper ends of the first wall portions 11W.

The fifth regions 15 are connected to the fourth wall portion 14W located on the outer edge of the light-reflecting member. The fifth region 15 can be a region having the first wall portion 11W (15*m* in FIG. 2C), which is connected to the fifth portion 15B. The fifth region 15 can be a region having the first wall portion 11W and the second wall portion 12W, which are connected to the fifth portion 15B. The fifth region 15 can be a region having the first wall portion 11W, the second wall portion 12W, and the third wall portion 13W (15*r* in FIGS. 1C and 2C), which are connected to the fifth portion 15B. The fifth region 15 can be a region having the first wall portion 11W and the third wall portion 13W, which are connected to the fifth portion 15B. The fifth region 15 can be a region having the second wall portion 12W and the third wall portion 13W (15*t* in FIG. 2C), which are connected to the fifth portion 15B.

Figure 2G:
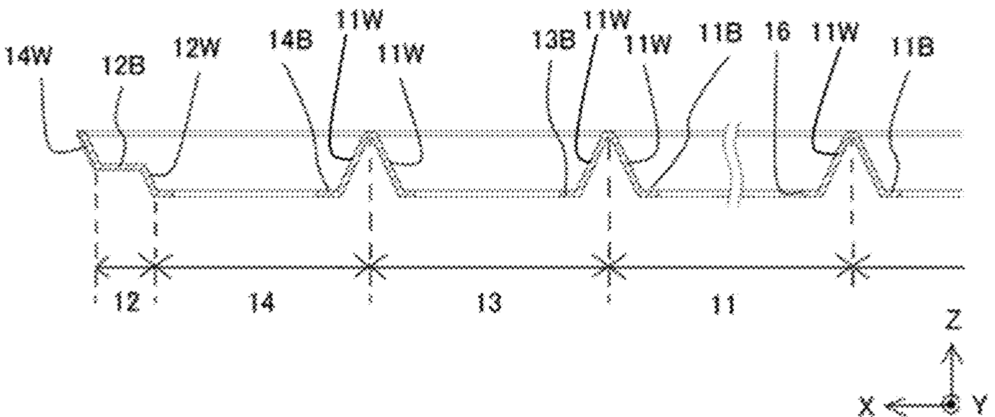
FIG. 2G is a partially enlarged view of the cross-section taken along line IIG-IIG of FIG. 2C.

For example, as shown in FIG. 1A etc., when the fifth portion 15B has a square shape or a similar shape, the fifth region 15 may have the fifth portion 15B and three first wall portions 11W located at its three sides. The fifth region 15 may have the fifth portion 15B and two first wall portions 11W located at its two sides and a single second wall portion 12W located at its one side. The fifth region 15 may have the fifth portion 15B and a single first wall portion 11W, a single second wall portion 12W, and a single third wall portion 13W respectively located at its three sides. The fifth region 15 may have the fifth portion 15B and two first wall portions 11W located at its two sides and a single third wall portion 13W located at its one side. Also, as shown in FIG. 2A etc., when the fifth portion 15B has a regular hexagonal shape or a similar shape, the fifth region may have the fifth portion 15B and four first wall portions 11W located at its four sides. The fifth region 15 may have the fifth portion 15B and three first wall portions 11W located at its three sides and a single second wall portion 12W and a single third wall portion 13W respectively located at its two sides. The fifth region 15 may have the fifth portion 15B and two first wall portions 11W located at its two sides and a single second wall portion 12W and a single third wall portion 13W respectively located at its two sides. The fifth region 15 may have the fifth portion 15B and two second wall portions 12W located at its two sides and three third wall portions 13W located at its three sides. The fifth region 15 may have the fifth portion 15B and two first wall portions 11W located at its two sides, two third wall portions 13W located at its two sides, and a single second wall portion 12W located at its one side. For example, as shown in FIG. 2G, the demarcated region of the fifth region 15 can be indicated as a region between the upper end of the fourth wall portion 14W and the first wall portion 11W that faces the fourth wall portion 14W across a corresponding one of the fifth portions 15B.

Fourth Wall Portion 14W

As shown in FIGS. 1E to 1G and FIGS. 2D to 2G, it is preferable that the light-reflecting member further include the fourth wall portion 14W. The fourth wall portion 14W may be partially absent at the outer edge of the light-reflecting member 40, or may be present at the entire outer periphery of the light-reflecting member 40.

It is preferable that the fourth wall portion 14W is located, for example, connected to the second portions 12B or the fifth portions 15B that are arranged adjacent to the outer edge of the light-reflecting member 10. When the fourth wall portion 14W is arranged connected to the second portions 12B, the height of the fourth wall 14W is smaller than the height of the fourth wall portion 14W arranged connected to the fifth portions 15B. In both cases, it is preferable that the height of the upper end of the fourth wall portion 14W is the same as the height of the first wall portions 11W, and the height of the fourth wall portion 14W is uniform with respect to the first wall portions 11W. The fourth wall portion 14W is located so that it rises upwards (i.e. in the Z-direction, which is perpendicular to the X-direction and Y-direction) from the outer edges of the second portions 12B or the fifth portions 15B. The fourth wall portion 14W may rise perpendicular or be tilted to the second portions 12B or the fifth portions 15B. The angle of inclination of the fourth wall portion 14W can be, for example, in a range of 45 to 80 degrees as similar to the first wall portions 11W and the third wall portions 13W.

As described above, the light-reflecting member 10 includes the fourth wall portion 14W arranged at the outer edge of the light-reflecting member in a plan view. It is preferable that the light-reflecting member 10 has the first wall portions 11W, the second wall portions 12W, and the third wall portions 13W surrounding respective bottom portions. For example, the first wall portions 11W, the second wall portions 12W, and the third wall portions 13W are arranged connected together in a frame shape that are regularly extended in a matrix. It is preferable that the upper ends of the interconnected wall portions create frame shapes each having a triangular lattice shape, a quadrangular lattice shape, or a hexagonal lattice shape in a plan view. In other words, the first wall portions 11W, the second wall portions 12W and the third wall portions 13W can be arranged in appropriate frame shapes according to the number and locations of the light sources 9 on the substrate 8 to be described below. For example, as shown in FIG. 1A, upper ends of four adjacent first demarcated regions of the first regions 11 meet at one point in a plan view. Also, for example, as shown in FIGS. 2A and 3 etc., upper ends of three adjacent first demarcated regions of the first regions 11 meet at one point in a plan view. Also, for example, upper ends of six adjacent first demarcated regions of the first regions 11 meet at one point in a plan view. That is, such frame shapes are preferably arranged in tessellation. The pitches (P in FIG. 1F) between the upper ends (or ridges) of the wall portions among the first wall portions 11W, the second wall portions 12W, the third wall portions 13W can be appropriately adjusted according to the size of the light sources, the size of the light source device, etc. The pitches between the upper ends (or ridges) of the wall portions among the first wall portions 11W, the second wall portions 12W, and the third wall portions 13W can be, for example, in a range of 1 to 50 mm, preferably in a range of 5 to 20 mm, more preferably in a range of 6 to 15 mm. In particular, the pitches between the upper ends (or ridges) of adjacent wall portions among the first wall portions 11W, the second wall portions 12W, and the third wall portions 13W are preferably the same.

As that of the first wall portions 11W, at least two wall portions of the second wall portions 12W and the third wall portions 13W of adjacent demarcated regions may form flat upper ends or may form edges. That is, as shown in FIGS. 1D to 1G and FIGS. 2D to 2G, a longitudinal cross-section of at least two wall portions that form upper ends of the wall portions preferably has a triangular shape (or triangular shape with rounded apex), more preferably has an isosceles triangular shape. It is more preferable that the triangular shape or isosceles triangular shape is an acute-angled triangular shape or acute-angled isosceles triangular shape. With this arrangement, the volume of the light-reflecting member 10 can be reduced, which reduce the height of the light-reflecting member 10, thereby realizing a light source device of a smaller thickness. It is preferable that the fourth wall portions 14W are also be sides of respective acute-angled triangular shapes in respective longitudinal cross-sectional shapes.

It is preferable that in the light-reflecting member 10, at least the first portions 11B, the third portions 13B, and the fourth portions 14B are arranged in tessellation with the respective surrounding wall portions.

It is preferable that in the light-reflecting member 10, a through-hole 16 corresponding to light source is formed at substantially the center (or the centroid) of each of the inner bottom portion of the first portions 11B, the third portions 13B, fourth portions 14B, and the fifth portions 15B. The shape and size of the through-holes 16 can be determined according to the shape and size of the light-sources etc., to expose the corresponding light sources 9, such that the periphery of each of the through-holes 16 is located close to the respective one of the light sources 9. With this arrangement, light from the light sources can also be reflected at the first portions 11B, the third portions 13B, the fourth portions 14B, and the fifth portions 15B, and thus can improve the light extraction efficiency. For example, through-holes 16 can be formed in a circular shape, an elliptic shape, a triangular shape, a polygonal shape such as a quadrangular shape, or a shape similar to those shapes in a plan view. The through-holes 16 can be formed with a maximum length in a range of 0.5 to 25 mm in a plan view.

In the examples shown in FIGS. 1E to 1G, the wall portions of the light-reflecting member 10 located between adjacent demarcated regions create hollow interior. Alternatively, the same material used for the wall portions or a different material may be disposed in the hollow interior. Alternatively, the wall portions of the light-reflecting member 10 may be disposed so as not to include hollow interior.

The bottom part (the first portions 11B, the third portions 13B, the fourth portions 14B and the fifth portions 15B) of the light-reflecting member 10 can have a thickness in a range of, for example, 100 to 300 μm. The first wall portions to fourth wall portions s of the light-reflecting member can have a thickness the same as that of the bottom part, or have different thickness.

The light-reflecting member 10 may be formed using a resin material containing a light-reflecting material made of particles such as titanium oxide, aluminum oxide, or silicon oxide. The light-reflecting member 10 may also be formed using a resin material that does not contain a light-reflecting material, and subsequently applying a light-reflecting material on its surfaces.

The light-reflecting member 10 can be rigid, flexible, or partially equipped with rigid and flexible parts. The light-reflecting member 10 can be a flat member or a curved member, or a member having a combination of flat part and curved part.

The light-reflecting member 10 can be formed by using, for example, a die molding method or an optical molding method. Examples of die molding methods include injection molding, extrusion molding, compression molding, vacuum forming, pressure forming. For example, applying vacuum forming or pressure forming to a light-reflecting sheet made of PET or the like, cutting is performed to obtain a predetermined shape, and further forming the through-holes to form the light-reflecting member 10 having integrally formed wall portions and bottom part.

Light Source Device

Figure 6:
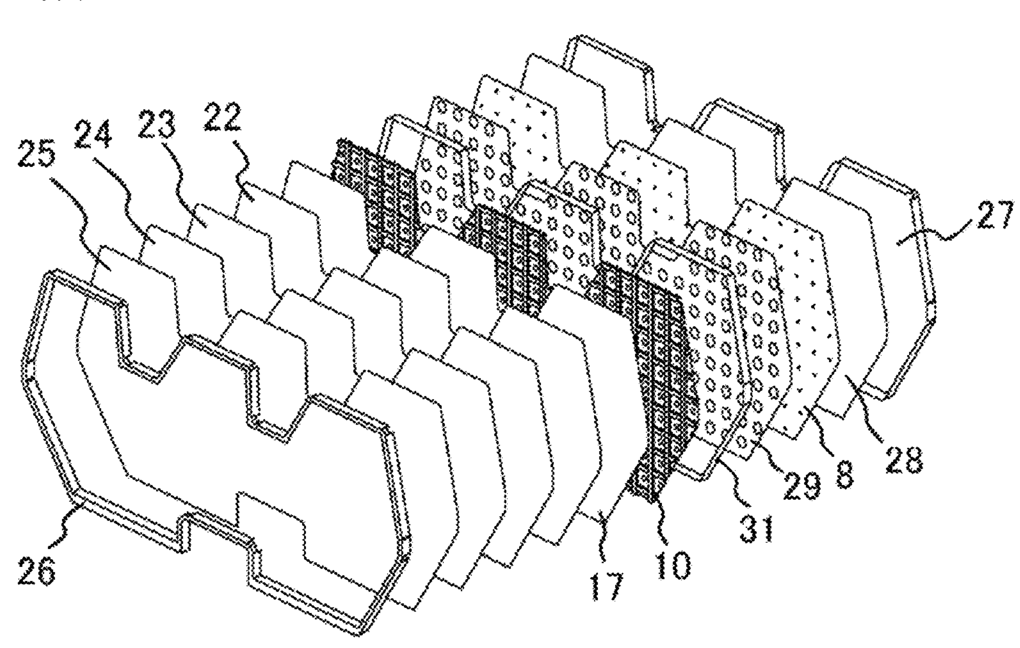
FIG. 6 is a schematic exploded perspective view of a light source device of one embodiment of the present invention.
Figure 7:
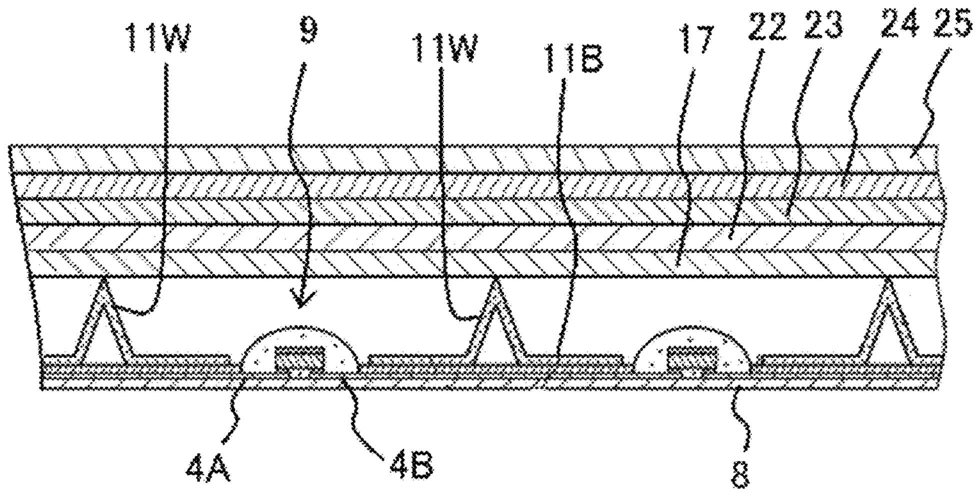
FIG. 7 is a schematic cross-sectional view of a main portion of the light source device shown in FIG. 6.

The light source device according to one embodiment of the present invention includes, as shown in FIGS. 6 and 7 etc., a substrate 8, a plurality of light sources 9, and the light-reflecting member 10 described above.

Light-Reflecting Member 10

In the light source device, it is preferable that the light-reflecting member 10 is arranged above the substrate 8, and the lower surface of the light-reflecting member 10 and the upper surface of the substrate 8 are secured to each other. In particular, the periphery of each of the through-holes 16 is preferably secured by a light-reflecting adhesive member such that light emitted from the light sources 9 does not enter between the substrate 8 and the light-reflecting member 10. For example, a light-reflecting adhesive member is more preferably disposed in a ring shape along the periphery of each of the through-holes 16. The adhesive member may be a double-sided adhesive tape, a hot-melt-type adhesive sheet, a thermosetting resin-based adhesive, or a thermoplastic resin-based adhesive. The adhesive member described above preferably have high flame retardancy.

The light-reflecting member 10 may be secured onto the substrate 8 by screws or the like.

The light-reflecting member described above can be adapted for a light source device with a polygonal shape such as a square shape, a rectangular shape, or the like, or a non-regular shape in conformity with an instrument, such that even when the light source device has a portion or portions impeding regular placement of the light sources, presence of darker areas when viewed from the light-extracting surface side can be effectively avoided.

Light Source 9

Figure 4:
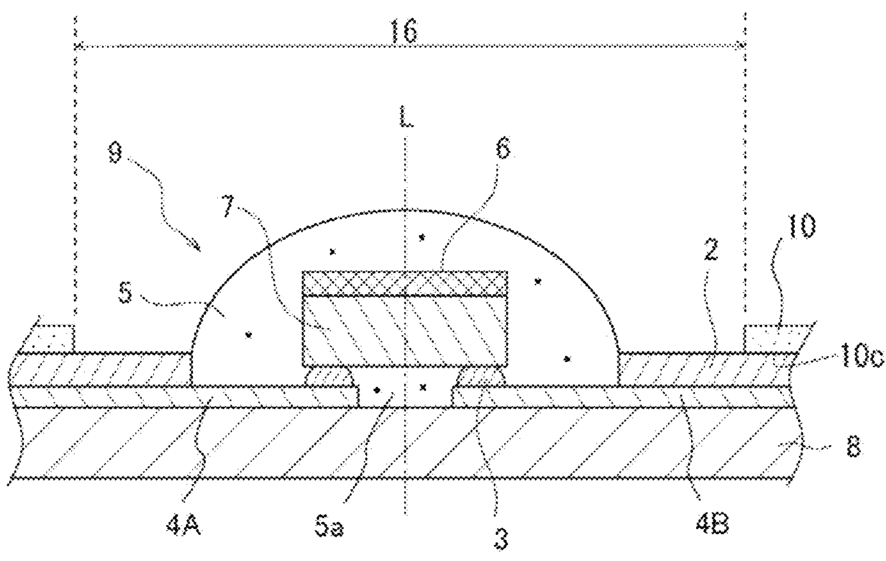
FIG. 4 is a partially enlarged schematic cross-sectional view showing a portion near a light emitting element of a light source device having the light-reflecting member shown in FIG. 1A.

Each of the plurality of light sources 9 is disposed on the substrate 8 as shown in FIG. 4. More specifically, the light sources 9 are disposed on the substrate 8, each within a corresponding one of the through holes 16 formed in the bottom of the light-reflecting member 10 disposed on the substrate 8. However, depending on the shape of the light-reflecting member, in the fifth region 15, it may not be possible to form a through-hole 16 of the same shape and size as that in the first portions 11B etc., where even when a through hole is formed, there may be an inner bottom portion 15B where no light source is placed.

The light sources 9 are members configured to emit light, and include, for example, light emitting elements that are configured to produce light, light emitting element(s) enclosed by a light-transmissive resin or the like, and surface-mounting type light emitting devices in which light emitting element(s) is enclosed in packages. It is preferable that the plurality of light sources 9 are disposed on the substrate 8, respectively within the demarcated regions of the light-reflecting member, and are arranged in a regular array such as in a matrix. Accordingly, luminance unevenness within the plane can be reduced or prevented. In other words, it is preferable that the plurality of light sources 9 are respectively disposed in the through-holes 16 as shown in FIG. 1A etc., and are arranged in a regular matrix. As shown in FIGS. 2A and 3, the plurality of light sources 9 may be regularly arranged In a row direction, while shifting the light sources 9 of adjacent rows by half the amount (length) in a column direction.

For example, as shown in FIG. 4, the light sources 9 including a light emitting element 7 covered by a sealing member 5 can be employed. A single light source 9 may include a single light emitting element 7, or may include a plurality of light emitting elements 7.

Figure 5:
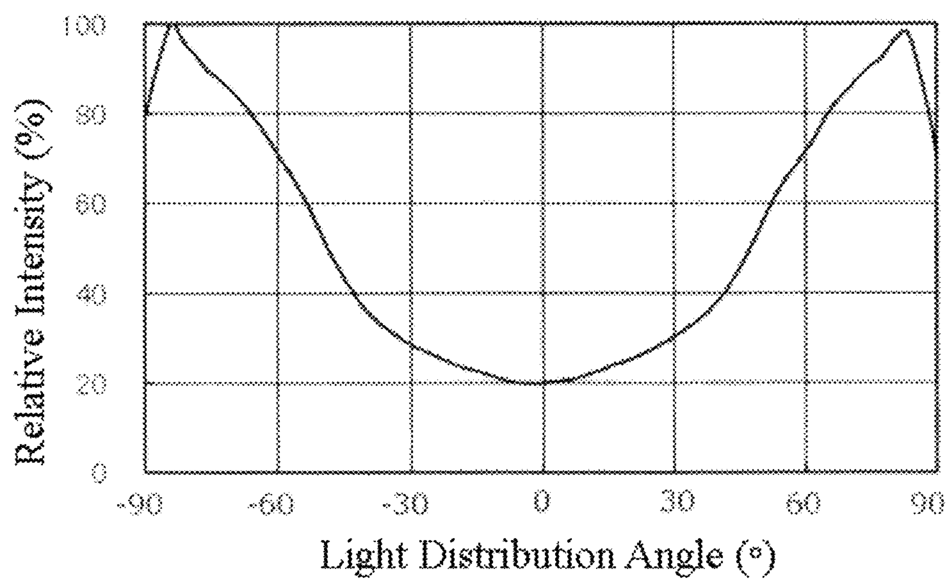
FIG. 5 is a graph showing a batwing light distribution of a light-emitting element of the light source device having the light-reflecting member shown in FIG. 1A.

Each of the light sources 9 preferably produces a wide light distribution such that emission of light with a small difference in brightness can be achieved at each of the regions surrounded by the wall portions of the light-reflecting member 10 to be described below. In particular, each of the light sources 9 preferably can produce a batwing light distribution as shown in FIG. 5. This allows for a reduction in the amount of light emitted in a perpendicularly upward direction relative to each of the light emitting elements 7, which allows for expansion of distribution of light of each of the light sources. The expanded light is irradiated on the light-reflecting member 10 and reflected, and thus difference in brightness in each of the regions surrounded by the wall portions.

The term "batwing light distribution" used herein can be defined as an emission intensity distribution exhibiting higher emission intensities at angles with absolute values of light distribution angle greater than zero, with respect to the emission intensity at zero degree, where the optical axis is aligned at zero degree. The term "optical axis L" used herein can be defined as shown in FIG. 4, as a line passing through the center of each of the light sources 9 and perpendicular to the plane of the substrate 8 to be described below.

In particular, the light sources 9 configured to produce a batwing light distribution may have a structure as shown in FIG. 4, in which a light emitting element 7 having a light-reflecting film 6 on its upper surface. Accordingly, light emitted in upward direction emitted from the light emitting element 7 is reflected at the light-reflecting film 6 such that the amount of light directly above the light emitting element 7 is reduced to produce batwing light distribution. It is also possible to combine one or more lenses separately to create a butt-wing light distribution.

The light-reflecting film 6 disposed on the upper surface of the light emitting element 7 may be a metal film of silver, copper, or the like, a dielectric multilayer film (DBR film), a white resin, or a combination of one or more of them. The light-reflecting film 6 preferably has an associated reflectivity that exhibits angle dependence on the incidence angle to the emission wavelength of the light emitting element 7. More specifically, the light-reflecting film 6 preferably has a reflectance smaller to oblique incident light than to perpendicularly incident light. With this arrangement, a gradual change in the luminance can be obtained directly above the light emitting element and accordingly, occurrence of undesirable darker portion, such as occurrence of perceivably darker portion directly above the light emitting element can be prevented or reduced.

The light sources 9 may have the light-emitting elements 7 directly mounted on the substrate with a height in a range of 100 to 500 μm, for example. The light-reflecting film 6 may have a thickness in a range of 0.1 to 3.0 μm. The light sources 9 may have a thickness in a range of 0.5 to 2.0 mm inclusive of the sealing member 5 to be described below.

It is preferable that the plurality of light sources 9 are mounted on the substrate 8 to be described below such that a respective one of the plurality of light sources 11 can be operated discretely, and that illumination control (local dimming, high dynamic range (HDR), etc.) can be carried out at a respective one of the plurality of light sources 9.

Light-Emitting Element 7

For the light emitting elements 7, any appropriate light emitting elements known in the art can be used. For example, light-emitting diodes are preferably used as the light emitting elements. The light-emitting elements of any desired wavelengths can be employed. For example, a light emitting element for emitting light of a blue color or a green color, a nitride-based semiconductor can be used. For a light emitting element for emitting light of a red color, GaAlAs, AlInGaP, etc., can be used. Semiconductor light emitting elements made of materials other than those described above may also be used. The composition, the color of emitting light, the size and the number of light emitting elements can be selected appropriately, according to the purpose and application.

The light-emitting elements 7 can be mounted in a flip-chip manner, in which, as shown in FIG. 4, each of the light-emitting elements 7 is flip-chip mounted on the substrate 8 in a flip-chip manner via a bonding member 3. The light emitting element 7 may be mounted in a face-up manner. The bonding member 3 is configured to secure the light emitting element 7 to the substrate or to the electrically conductive wirings and for example, made of an insulating resin, an electrically conductive material, or the like. When the light emitting elements 7 are mounted in a flip-chip manner, an electrically conductive bonding member may be used as shown in FIG. 4. Specific examples of such a member include an Au-containing alloy, an Ag-containing alloy, a Pd-containing alloy, an In-containing alloy, a Pd—Pd containing alloy, an Au—Ga containing alloy, an Au—Sn containing alloy, a Sn containing alloy, a Sn—Cu containing alloy, a Sn—Cu—Ag containing alloy, an Au—Ge containing alloy, an Au—Si containing alloy, an Al-containing alloy, a Cu—In containing alloy, and a mixture of a metal and a flux.

Sealing Member 5

The sealing member 5 is disposed to cover the light emitting element 15 to protect the light emitting element 15 from external environment and also to, for example, optically control the light emitted from the light emitting element 15. The sealing member 5 is made of a light-transmissive material. Examples of the materials of the sealing member 21 include light-transmissive resin such as epoxy resin, silicone resin, resins which are mixtures of those, and glass. In view of light-resisting properties and ease of molding, silicone resin is preferably used. The sealing member 5 may contain a wavelength converting material such as a fluorescent material configured to absorb light from the light emitting element 15 and emit light of different wavelength than that of light emitted from the light emitting element 15, a light-diffusion agent configured to diffuse light from the light emitting element 15, and/or a coloring agent corresponding to the color of light emitted from the light emitting element 15.

For the fluorescent material, the light diffusion agent, and the coloring agent, any appropriate known materials in the art can be used.

The sealing member 5 may be in direct contact with the substrate 8.

The sealing member 5 may be disposed such that a viscosity of the material is adjusted for printing, dispenser printing, or the like, and applied, then, hardened by using heat treatment, light-irradiation, or the like. The sealing member 5 can be formed in a shape, for example, a substantially hemispherical shape, an elongated dome shape (a length in the Z-direction is larger than a length in the X-direction) in a cross-sectional view, a flat dome shape (a length in the X-direction is larger than a length in the Z-direction) in a cross-sectional view, or a circular or elliptical shape in a top plan view.

The sealing members 5 may also be disposed as an underfill 5*a* between the lower surface of the light-emitting element 7 and the upper surface of the substrate 8.

Substrate 8

The substrate 8 is configured to mount a plurality of light sources 9 thereon, and as shown in FIG. 4, and wiring layers 4A and 4B are disposed on the upper surface of the substrate 12 to supply electric power to the light sources 9 such as the light-emitting elements 7. Of the wiring layers 4A and 4B, portions of the regions that are not used to establish electrical connection with the light-emitting elements are preferably covered by a covering member 2.

The substrate 8 is made of a material that can insulatingly separate the positive wiring layer 4A from the negative wiring layer 4B. Examples of the material of the substrate 8 include ceramics, resin, and composite materials. Examples of the resin include phenol resin, epoxy resin, polyimide resin, BT resin, polyphthalamide (PPA), and polyethylene terephthalate (PET). Examples of the composite materials include the resins described above having an inorganic filler such as glass fiber, $SiO_2$, $TiO_2$, or $Al_2O_3$ mixed therein, and glass fiber reinforced resin (glass epoxy resin), and a metal substrate including a metal member with an insulating layer formed thereon.

The substrate 8 can have an appropriate thickness, and either a flexible substrate that can be manufactured by, for example, a roll-to-roll processing, or a rigid substrate can be used. The rigid substrate may be a thin-type bendable rigid substrate.

The wiring layers 4A and 4B can be made of any appropriate electrically conductive material, and generally a material used for wiring layers of a circuit substrate or the like, can be used. The surface of the electrically conductive wirings may be provided with a plated film, a light-reflecting film, or the like.

The covering member 2 is preferably made of an insulating material. Examples of the insulating materials include the materials similar to those illustrated for the substrate. When the sealing member is formed of such a resin to which a white filler or the like is contained, Leakage and/or absorption of light can be reduced or prevented, and the light extraction efficiency of the light source device can be improved.

Other Component Members

As shown in FIGS. 6 and 7, the light source device according to the present embodiment preferably further include such as a light-diffusing plate 17 and/or a light-diffusing sheet 22, a wavelength converting sheet 23, a prism sheet 24, a polarizing sheet 25, as shown in FIGS. 6 and 7. It is desirable to have prism sheets 24, polarizing sheets 25, a mounting substrate 27 with light-reflecting wall surrounding the outer periphery of the substrate, a covering substrate 26 with a light-reflecting wall surrounding the outer periphery of the light-reflecting member 26. Those members can be layered with an adhesive and/or light-reflecting layers 28, 29, 31 or the like appropriately arranged therebetween. In such a light source device, an LCD panel or the like may be arranged over the structure as described above to form a surface-emitting light source device for use as a direct-downward backlight light source. The sequence of layering those optical members can be appropriately set.

Light-Diffusing Plate 17 and/or Light-Diffusing Sheet 22

The light-diffusing plate 17 and/or the light-diffusing sheet 22 (hereinafter may be referred simply to "light-diffusing plate 17") is configured to allow incident light to transmit therethrough while being diffused, and it is preferable that a single light-diffusing plate 17 is disposed above the plurality of light sources 9. It is preferable to position the light-diffusing plate 17 to be in contact with or in closer proximity to the upper ends of the first wall portions 11W and the fourth wall portions 14W. The light-diffusing plate 17 may have an irregular structure on the surface facing the substrate 8, or the light-diffusing plate 17 may have a flat plate-like shape. The light-diffusing plate 17 is preferably located substantially in parallel to the substrate 8. The light-diffusing plate 17 can be formed with a material exhibiting small absorption of visible light, such as polycarbonate resin, polystyrene resin, acrylic resin, polyethylene resin, or the like. In order to diffuse incident light, the light-diffusing plate 17 may have an uneven surface or a material having different refractive index may be dispersed in the light-diffusing plate 17.

The height differential of the uneven surface may be, for example, in a range of 0.01 to 0.1 mm.

Examples of the materials having different refractive indices include polycarbonate resin, acrylic resin, or the like.

The thickness and the degree of diffusion of light of the light-diffusing plate 17 can be appropriately set, and a light-diffusing sheet, a light-diffusing film, or the like, a material available in the market can be employed. For example, the light-diffusing plate 17 may have a thickness in a range of 1 to 2 mm.

When the wall portions of the light-reflecting member 10 are arranged with a pitch P, the light-diffusing plate 17 is preferably disposed such that a distance between the light-diffusing plate and each of the light sources, that is, a height OD is less than or equal to 0.3P, preferably less than or equal to 0.25P. The height OD can be referred to as a distance (OD1) as shown in FIG. 1H, from the outermost surface of the substrate 8, that is, when the substrate 8 is provided with the covering member 2, wiring layers 4A and 4B, or the like, the outermost surface of those, to the lower surface of the light-diffusing plate 17. From another perspective, the light-diffusing plate 17 is preferably disposed at a distance in a range of 1.5 to 5 mm, more preferably in a range of 2 to 3 mm from the upper surface of the lower surface 10c of the light-reflecting member 10.

Wavelength-Converting Sheet 23

The wavelength converting sheet 23 may be disposed on the upper surface or the lower surface of the light-diffusing plate 17, or as shown in FIG. 6 and FIG. 7, on the upper surface of the light-diffusion plate 17 and/or the upper surface of the light-diffusion sheet 22. The wavelength-converting sheet 23 is configured to absorb a portion of light emitted from the light sources 9 and emit light having a wavelength different from the wavelength of light emitted from the light sources 9. For example, the wavelength-converting sheet 23 absorbs a portion of blue light emitted from the light sources 9 and emits yellow light, green light and/or red light, such that the light source device to emit white light can be obtained. The wavelength converting sheet 23 is located spaced apart from the light emitting elements 21 of the light sources 9, allowing for use of a fluorescent material or the like, which is less resistant to light of high intensity and cannot be used near the light emitting elements. Accordingly, performance of the light source device as a backlight can be improved. The wavelength converting sheet 23 has a sheet shape or a layer shape, and includes the fluorescent material etc. described above.

Prism Sheet 24

The prism sheet 24 has a surface provided with arrays of a plurality of prisms extending in a predetermined direction. The prism sheet 24 having a layered structure may be employed. For example, assuming an X-direction and a Y-direction perpendicular to the X-direction on a plane of a sheet, layered sheets of a sheet having an array of a plurality of prisms extending in the Y-direction and a sheet having an array of a plurality of prisms extending in the X-direction can be used. The prism sheets are configured such that light incident on the prism sheet from different directions is reflected in a direction toward a display panel that is facing the light source device. Accordingly, light emitted from the light-emitting surface of the light source device can be directed mainly in an upward direction perpendicular to the upper surface of the light emitting device, such that the luminance viewed from the front of the light emitting device can be increased.

Polarizing Sheet 25

The polarizing sheet 25 can be configured, for example, to selectively transmit light traveling in the polarization direction of a polarization plate that is located at a backlight side of a display panel, for example, a liquid crystal display panel, and to reflect the polarized light traveling in a direction perpendicular to the polarization direction toward the prism sheet 24. For the polarizing sheet 25, the prism sheet 24, etc., commercially available optical members for backlight can be employed.

Covering Substrate 26 and/or Mounting Substrate 27, Adhesive Layer and/or Light-Reflecting Layers 28, 29, 31

The covering substrate 26 has a light-reflecting wall surrounding the circumference of the light-reflecting member 10. The light-reflecting wall is configured to cover the upper peripheries of the light-reflecting member 10 and the optical members such as the light-diffusing plate 17 to secure or hold.

The mounting substrate 27 has a light-reflecting wall surrounding the outer periphery of the substrate 8, and is configured to cover the substrate 8 from the back side of the substrate 8.

The light-reflecting walls of those members are brought in contact or engaged with each other to prevent light emitted from the light emitting devices from leaking to the outside of the light source device, and to improve the brightness at the light-emitting surface.

Those members can be formed of various materials that can reflect light emitted from the light emitting devices, and examples of such materials include resin containing a light-reflecting material, metal, and ceramics.

The adhesive layer and the light-reflecting layer can be formed of a material that can adhere adjacent members and can reflect direct and indirect light emitted from the light-emitting devices. Examples thereof include various kinds of materials such as a double-sided adhesive tape, a hot-melt-type adhesive sheet, a thermosetting resin-based adhesive, and a thermoplastic resin-based adhesive.

First Embodiment

As shown in FIGS. 1A to 1I, the light-reflecting member 10 according to the first embodiment has an outer shape similar to a trapezoidal shape with straight and curved sides, and the portions corresponding to the upper and lower corners of the trapezoidal shape are rounded with different curvatures. For example, the light-reflecting member may have a maximum width of 700 mm in the X-direction and a maximum width of 125 mm in the Y-direction.

The light-reflecting member 10 has a plurality of inner bottom portions arranged in a regular manner in rows and columns, and wall portions connected to and surrounding each of the inner bottom portions, and a wall portion surrounding the outer periphery of the light-reflecting member 10. For example, each of the inner bottom portions has a square shape with dimensions of 6.6×6.6 mm, and upper end portions of the wall portions surrounding each of the inner bottom surfaces are arranged in a square frame shape in a plan view.

The light-reflecting member 10 includes the first regions 11 on the inward side, and the third regions 13, the fourth regions 14, the fifth regions, and the second regions on the outward side of the first regions 11. Third regions 13 are located adjacent to the first regions 11. Some of the fourth regions 14 are located adjacent to the first regions 11, the third regions 13, and the fifth regions 15. Some of the fourth regions 14 are located adjacent to the first regions 11, second regions 12, third regions 13, and also to the fifth region 15. The second regions 12 and the fifth regions 15 are located adjacent to the outer edge of the light-reflecting member.

Each of the first regions 11 includes the first portion 11B and the first wall portions 11W.

Each of the second regions 12 includes the second portion 12B. The second portions 12B are located higher than the first portions 11B. At a side closer to the first regions 11, each of the second portions 12B is connected to a corresponding one of the second wall portions 12W, which is lower than the first wall portions 11W.

Each of the third regions 13 includes the third portion 13B and the first wall portion 11W and the third wall portion 13W.

Each of the fourth regions 14 includes one of the fourth portions 14B and one of the first wall portions 11W and one of the second wall portions 12W, or includes one of the fourth portions 14B and one of the first wall portions 11W, one of the second wall portions 12W, and one of the third portions 13W.

Each of the fifth regions 15 includes one of the fifth portions 15B and first wall portions 11W, one of the fifth portions 15B and one of the first wall portions 11W, one of the second wall portions, one of the fifth regions 15B and one of the first wall portions 11W, one of the second wall portions 12W, and one of the third wall portions, or one of the fifth portions 15B and one or more of the first wall portions 11W and one more of the third wall portions. The fifth portions 15B are connected to the fourth wall portion that surrounds the outer periphery of the light-reflecting member 10.

The first portions 11B, the third portions 13B, and the fourth portions 14B have the same size and shape and are located at the same height. In other words, the first portions 11B, the third portions 13B, and the fourth portions 14B are located on the same plane with each other. The shapes and sizes of the fifth portions 15B may partially or totally different according to the outer shape of the light-reflecting member. As such, the fifth portions 15B having the size and shape the same as that of the first portions 11B may be included.

The second portions 12B collectively have dimensions in a plan view smaller than that of the first portions 11B. The second portions 12B may have the shapes and sizes partially or totally different from one other according to the outer shape of the light-reflecting member. The second portions 12B are located, for example, at a height of 1 mm with respect to the first portions 11B.

The first wall portions 11W have the same height as the fourth wall portions 14W. In other words, the upper end portions of the first wall portions 11W and the fourth wall portions 14W are substantially in the same plane, for example located at a height of 2 mm relative to the first portions 11B.

The third wall portions 13W have a smaller height relative to the first wall portions 11W. In other words, the upper end portions of the third wall portions 13W are located 1 mm lower relative to the upper end portion of the first wall portions and are located 1 mm higher relative to the first portions 11B. The upper ends of the third wall portions 13W are at the same height as the second portions.

The second wall portions 12W have a same height as that of the third wall portions W. In other words, the upper edge of the second wall portions 12W and the upper edges of the third wall portions 13W are in the same height.

The fourth wiring portions 14W are connected to the second portions 12B and the fifth portions 15B.

The first wall portions 11W and the third wall portions 13W have a sharp triangular shape in the cross-section in the X-Z plane, and as shown in FIGS. 1H and 1I, with the angles $\alpha 1$ (which is an angle of the upper end of the first wall portions 11W) and $\alpha 3$ (which is an angle of the upper end of the third wall portions 13W) at 40 degrees, and the angles $\gamma 1$ and $\gamma 3$ at 65 degrees, respectively. The height of the first wall portions 11W (OD1 in FIG. 1H) is 2 mm, and the height of the third wall portions 13W (OD3 in FIG. 1I) is 1 mm.

The light-reflecting member 10 according to the present embodiment can be obtained by applying press molding to a resin sheet of PET containing titanium oxide, cutting into a predetermined shape, and forming through-holes. Thus, the light-reflecting member 10 has the wall portions and the inner bottom portions formed in one body. The light-reflecting member can have a thickness of 0.2 mm. The through-holes are formed in the center of each inner bottom portion, and for example, defined in a circular shape with a diameter of 5.5 mm in a plan view.

Display devices such as in-vehicle instruments may have non-regular shapes in a plan view, which may cause presence of demarcated regions at a peripheral portion of a light-reflecting member unable to mount light sources. However, with the use of the light-reflecting member having the structure as described above, light emitted from the light sources propagating toward the second regions 12 can be reflected efficiently by the second portions 12B even when the light-reflecting member has such demarcated regions unable to mount light sources. Further, light from the light sources located in the demarcated regions (the third regions 13 or the fourth regions 14) located at the outer side with respect to the first regions 11 can be allowed to propagate above the third wall portions 13W having a height lower than the first wall portions 11W, and then propagate toward the second region 12. With this arrangement, luminance unevenness within the light emitting surface can be reduced or prevented. Further, light from the light sources located in the first regions 11 located inward of the light-reflecting member 10 can be prevented by the first wall portions 11W from propagating into adjacent demarcated regions, and thus can be reflected upward.

Second Embodiment

As shown in FIGS. 2A to 2G, the light-reflecting member 20 according to the second embodiment has an outer periphery of non-regular shape, which is similar to a trapezoidal shape with straight sides, with four rounded corners, in which the curvature corresponding to the bases and the curvature corresponding to the legs of the trapezoidal shape are different. For example, the light-reflecting member has a maximum width of 700 mm in the X-direction and a maximum width of 125 mm in the Y-direction.

The light-reflecting member 20 includes a plurality of inner bottom portions, wall portions surrounding and connected to each of the inner bottom portions, and a wall portion surrounding the outer edge of the light-reflecting member 20. The inner bottom portions have a regular hexagonal shape, and the upper ends of the wall portions form a frame shape with a regular hexagon tessellation in a plan view. The inner bottom portions are aligned adjacent to one other in the row direction, while adjacent rows of the inner bottom portions are aligned shifted a half width in the row direction to form a tessellation.

The light-reflecting member 20 includes the first regions 11 on the inward side, and the third regions 13, the fourth regions 14, the fifth regions 15, and the second regions 12 on the outer side with respect to the first regions 11. The third regions 13 are adjacent to the first regions 11, and also to the fourth regions 14 and the fifth regions 15. Each of the fourth regions 14 is also adjacent to the first region 11, the second region 12, the third region 13, and the fifth region 15. Each of the fifth regions 15 is adjacent to the first region 11, the second region 12, the third region 13 and the fourth region 14. The second regions 12 and the fifth regions 15 are adjacent to the outer edge of the light-reflecting member 20.

The light-reflecting member 20 has a configuration substantially similar to that of the light-reflecting member 10 according to the first embodiment, except for the configuration described above.

Third Embodiment

As shown in FIG. 3, the light-reflecting member 30 according to the third embodiment has an outer periphery of non-regular shape, which is similar to a trapezoidal shape with straight and curved sides, in which the curvature corresponding to the bases and the curvature corresponding to the legs of the trapezoidal shape are different.

The light-reflecting member 30 includes a plurality of inner bottom portions, wall portions surrounding and connected to each of the inner bottom portions, and a wall portion surrounding the outer edge of the light-reflecting member 30. The inner bottom portions have a regular hexagonal shape, and the upper ends of the wall portions form a frame shape with a regular hexagon tessellation in a plan view. The inner bottom portions are aligned adjacent to one other in the row direction, while adjacent rows of the inner bottom portions are aligned shifted a half width in the row direction to form a tessellation.

The light-reflecting member 30 includes the first regions 11 on the inward side, and the fourth regions 14, the fifth regions 15, and the second regions 12 on the outer side with respect to the first regions 11. Each of the fourth regions 14 is adjacent to the first region 11, the second region 12 and the fifth region 15. Each of the fifth regions 15 is adjacent to the first region 11, the second region 12, and the fourth region 14. The second regions 12 and the fifth regions 15 are adjacent to the outer edge of the light-reflecting member 30.

The second regions 12 are divided by wall with the second part 12B being the same height as the first wall. That is, each of the second portions 12B is connected to at least one second wall portion 12W1, which is the same height as the first wall portions 11W and the fourth wall portions 14W, on the side near the first regions 11, the fourth regions 14 or the fifth regions 15. In other words, in each of the second regions 12, at least one second wall portion 12W1 is located adjacent to the second portion 12B on the side closer to the first regions 11, the fourth regions 14 or the fifth regions 15.

The light-reflecting member 30 has a configuration substantially similar to that of the light-reflecting member 10 according to the first embodiment and the light-reflecting member 20 according to the second embodiment, except for the configuration described above.

The light source device according to the present invention can be used for various light source devices, such as back light sources for display devices, lighting devices, and light sources for automotive instruments.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A light-reflecting member comprising:
- a plurality of first regions each defined by a first portion and a plurality of first wall portions surrounding the first portion in a plan view with the first wall portions being connected to the first portion, the first regions being arranged in a tessellation in the plan view; and
- a plurality of second regions arranged on an outer side relative to the first regions in the plan view, each of the second regions including a second portion located higher than the first portion of each of the first regions, wherein
- the second portion is connected to at least one second wall portion on a side closer to an adjacent one of the first regions, the at least one second wall portion having a height smaller than a height of each of the first wall portions as measured from the first portion.

2. The light-reflecting member according to claim 1, further comprising
- a plurality of third regions arranged on the outer side relative to the first regions, wherein
- each of the third regions includes a third portion having a size and a shape that are the same as a size and a shape of the first portion, and
- the third portion is connected to and surrounded by the first wall portions and a third wall portion, the third wall portion having a height smaller than a height of each of the first wall portions.

3. The light-reflecting member according to claim 2, further comprising
- a plurality of fourth regions arranged on an outer side relative to the first regions, wherein
- each of the fourth regions includes a fourth portion having a size and a shape that are the same as the size and the shape of the first portion, and
- the fourth portion is connected to and surrounded by
  - at least one of the first wall portions and the at least one second wall portion, or
  - at least one of the first wall portions, the at least second wall portion, and the third wall portion.

4. The light-reflecting member according to claim 2, further comprising
- a plurality of fifth regions arranged on the outer side of the first regions, wherein
- each of the fifth regions includes
- a fifth portion connected to a fourth wall portion disposed along an outer periphery of the light-reflecting member, the fifth portion being further connected to and surrounded by
  - the first wall portions,
  - at least one of the first wall portions and the at least one second wall portion,
  - at least one of the first wall portions, the at least one second wall portion, and the third wall portion, or
  - at least one of the first wall portions and the third wall portion.

5. The light-reflecting member according to claim 2, wherein
- an upper end of the third wall portion is at the same height as an upper end of the at least one second wall portion.

6. The light-reflecting member according to claim 1, wherein
- the second portion has an area smaller than an area of the first portion in the plan view.

7. The light-reflecting member according to claim 1, wherein
- the second portion is connected to a fourth wall portion disposed along an outer periphery of the light-reflecting member.

8. The light-reflecting member according to claim 7, wherein
- an upper end of each of the first wall portions is at the same height as an upper end of the fourth wall portion disposed along the outer periphery of the light-reflecting member.

9. The light-reflecting member according to claim 1, wherein
- upper ends of the first wall portions form a triangular lattice shape, a quadrangular lattice shape, or a hexagonal lattice shape in the plan view.

10. A light source device comprising:
- the light-reflecting member according to claim 1;
- a substrate;
- a plurality of light sources disposed on the substrate, wherein
- the light-reflecting member is disposed on the substrate,
- the first portions of the light-reflecting member respectively define through-holes, and the light-sources are respectively located within the through-holes.

11. The light source device according to claim 10, wherein each of the light sources is configured to produce a batwing light distribution.

12. The light-reflecting member according to claim 1, wherein the at least one second wall portion is not arranged continuously with the first wall portions.

13. A light-reflecting member comprising:

a plurality of inner bottom portions;

a plurality of wall portions surrounding each of the inner bottom portions, the wall portions including a plurality of inner wall portions located on an inner side in a plan view, and a plurality of outer wall portions located on an outer side in the plan view, with the inner wall portions having the same height and the outer wall portions having smaller heights than the inner wall portions as measured from the inner bottom portions; and a plurality of outer bottom portions arranged on an outer side of the outer wall portions in the plan view, the outer bottom portions being positioned higher than the inner bottom portions.

14. A light source device comprising:

the light-reflecting member according to claim 13;

a substrate;

a plurality of light sources disposed on the substrate, wherein the light-reflecting member is disposed on the substrate, the inner bottom portions of the light-reflecting member respectively define through-holes, and the light-sources are respectively located within the through-holes.

15. The light source device according to claim 14, wherein each of the light sources is configured to produce a batwing light distribution.

16. A light-reflecting member comprising:

a plurality of first regions each surrounded by a plurality of first wall portions in a plan view with the first regions being arranged in a matrix in the plan view;

a plurality of second regions arranged on an outer side relative to the first regions in the plan view, each of the second regions including an outer wall portion at least partially inclined so that a height of the outer wall portion is reduced from the outer side toward an inner side, and a second wall portion connected to an inner side end of the outer wall portion;

a plurality of third regions arranged between the first regions and the second regions in the plan view, each of the third regions includes at least one third wall portion having a height smaller than a height of each of the first wall portions.

17. The light-reflecting member according to claim 16, wherein each of the third regions includes a region surrounded by the at least one third wall portion and one of the first wall portions extending in a first direction, and two of the first wall portions extending in a second direction perpendicular to the first direction.

18. The light-reflecting member according to claim 16, wherein the at least one third wall portion and one of the first wall portions extend along the same direction and are connected to each other.

19. The light-reflecting member according to claim 16, wherein the second regions are disposed along an entire outer periphery of the light-reflecting member.

* * * * *